United States Patent
Yim et al.

(10) Patent No.: US 10,466,548 B2
(45) Date of Patent: Nov. 5, 2019

(54) DISPLAY DEVICE

(71) Applicant: Samsung Display Co. Ltd., Yongin-si (KR)

(72) Inventors: Tae Kyung Yim, Seoul (KR); Su Wan Woo, Osan-si (KR); Yeo Geon Yoon, Suwon-si (KR); Nak Cho Choi, Hwaseong-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/180,131

(22) Filed: Jun. 13, 2016

(65) Prior Publication Data

US 2017/0131599 A1 May 11, 2017

(30) Foreign Application Priority Data

Nov. 11, 2015 (KR) .......................... 10-2015-0158251

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01); *G02F 2001/134345* (2013.01)

(58) Field of Classification Search
CPC ......... G02F 1/134309; G02F 1/133707; G02F 2001/134345; G02F 1/133555; H01L 27/124
See application file for complete search history.

(56) References Cited

U.S. PATENT DOCUMENTS

| 2008/0094560 | A1* | 4/2008 | Baek ................. | G02F 1/134336 349/144 |
| 2011/0149179 | A1* | 6/2011 | Tsubata ............. | G02F 1/136213 348/792 |
| 2013/0242239 | A1* | 9/2013 | Chang ............... | G02F 1/133707 349/106 |
| 2014/0024156 | A1* | 1/2014 | Koito ................ | G02F 1/133707 438/30 |
| 2014/0211142 | A1* | 7/2014 | Kim .................. | G02F 1/133707 349/138 |

FOREIGN PATENT DOCUMENTS

| KR | 1020100071141 | 6/2010 |
| KR | 1020140110829 | 9/2014 |
| KR | 1020150026481 | 3/2015 |
| KR | 1020170000026 | 1/2017 |

* cited by examiner

*Primary Examiner* — Nathanael R Briggs
(74) *Attorney, Agent, or Firm* — Cantor Colburn LLP

(57) ABSTRACT

A display device includes a first substrate including a first base substrate, a first sub-pixel electrode, which is disposed on a first surface of the first base substrate, a passivation layer, which is disposed on the first sub-pixel electrode, and a second sub-pixel electrode, which is disposed on the passivation layer and partially overlaps the first sub-pixel electrode, a second substrate facing the first substrate, and a liquid crystal layer disposed between the first substrate and the second substrate, where the second sub-pixel electrode includes a first portion, which is apart from the first surface of the first base substrate by a first distance, and a second portion, which is apart from the first surface of the first base substrate by a second distance which is less than the first distance.

35 Claims, 20 Drawing Sheets

DISPLAY DEVICE

This application claims priority to Korean Patent Application No. 10-2015-0158251, filed on Nov. 11, 2015, and all the benefits accruing therefrom under 35 U.S.C. § 119, the content of which in its entirety is herein incorporated by reference.

BACKGROUND

1. Field

Exemplary embodiments of the invention relate to a display device.

2. Description of the Related Art

A liquid crystal display ("LCD"), which is one of the most widely-used flat panel displays, generally includes two substrates on which field-generating electrodes such as pixel electrodes and a common electrode are formed and a liquid crystal layer which is interposed between the two substrates. The LCD generates an electric field in the liquid crystal layer by applying a voltage to the field-generating electrodes so as to determine the alignment of liquid crystal molecules in the liquid crystal layer, and controls the polarization of light incident thereupon, thereby displaying an image.

In the meantime, a vertical alignment ("VA")-mode LCD, among various modes of LCDs, has recently being developed. The VA-mode LCD is a type of LCD in which liquid crystal molecules are aligned such that their major axis can be perpendicular to a substrate in the absence of an electric field.

It is desired to secure a wide viewing angle for a VA-mode LCD, and to this end, various methods such as defining cutouts such as fine slits on field-generating electrodes may be used. Since cutouts and protrusions determine the tilt direction of liquid crystal molecules, the viewing angle of a VA-mode LCD may be widened by appropriately arranging cutouts and protrusions so as to diversify the tilt direction of liquid crystal molecules.

SUMMARY

In a method in which fine slits are defined in each pixel electrode so as to provide a plurality of branch electrodes, the aperture ratio of a liquid crystal display ("LCD") may decrease, and as a result, the transmittance of the LCD may also decrease.

Also in a case in which a plurality of branch electrodes or slits several micrometers apart from one another are provided in each pixel electrode, the refractive index or transmittance of an insulating layer or the like disposed below each pixel electrode may at least partially vary, and as a result, the display quality of an LCD may deteriorate.

Exemplary embodiments of the invention provide a display device with an improved display quality.

According to an exemplary embodiment of the invention, there is provided a display device. The display device includes a first substrate including a first base substrate, a first sub-pixel electrode, which is disposed on a first surface of the first base substrate, a passivation layer, which is disposed on the first sub-pixel electrode, and a second sub-pixel electrode, which is disposed on the passivation layer and partially overlaps the first sub-pixel electrode, a second substrate facing the first substrate, and a liquid crystal layer disposed between the first substrate and the second substrate, where the second sub-pixel electrode has a first portion, which is apart from the first surface of the first base substrate by a first distance, and a second portion, which is apart from the first surface of the first base substrate by a second distance less than the first distance.

According to another exemplary embodiment of the invention, there is provided a display device. The display device includes a first substrate including a first base substrate, a first sub-pixel electrode, which is disposed on a first surface of the first base substrate, a passivation layer, which is disposed on the first sub-pixel electrode, and a second sub-pixel electrode, which is disposed on the passivation layer and partially overlaps the first sub-pixel electrode, a second substrate facing the first substrate and including a second base substrate and a common electrode, which is disposed on a first surface of the second base substrate facing the first substrate, and a liquid crystal layer disposed between the first substrate and the second substrate, where the second sub-pixel electrode has a first portion, which is apart from the common electrode by a first distance, and a second portion, which is apart from the common electrode by a second distance larger than the first distance.

According to the exemplary embodiments, a display device with an improved display quality may be provided.

Other features and exemplary embodiments will be apparent from the following detailed description, the drawings, and the claims.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
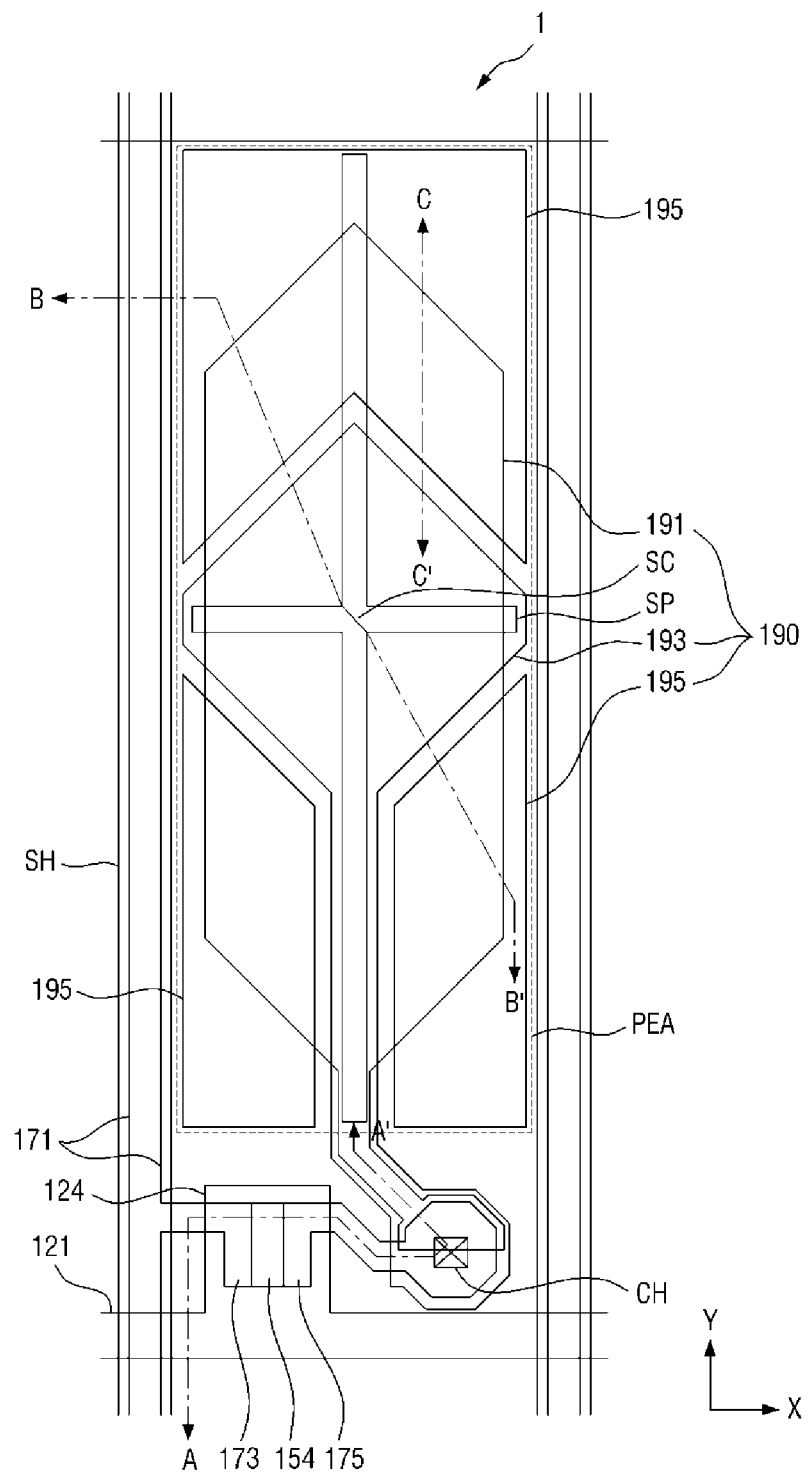
FIG. 1 is a plan view of an exemplary embodiment of a first substrate, and particularly, a pixel, of a display device according to the invention.

Features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this invention will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the application belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Exemplary embodiments of the invention will hereinafter be described with reference to the accompanying drawings.

Figure 2:
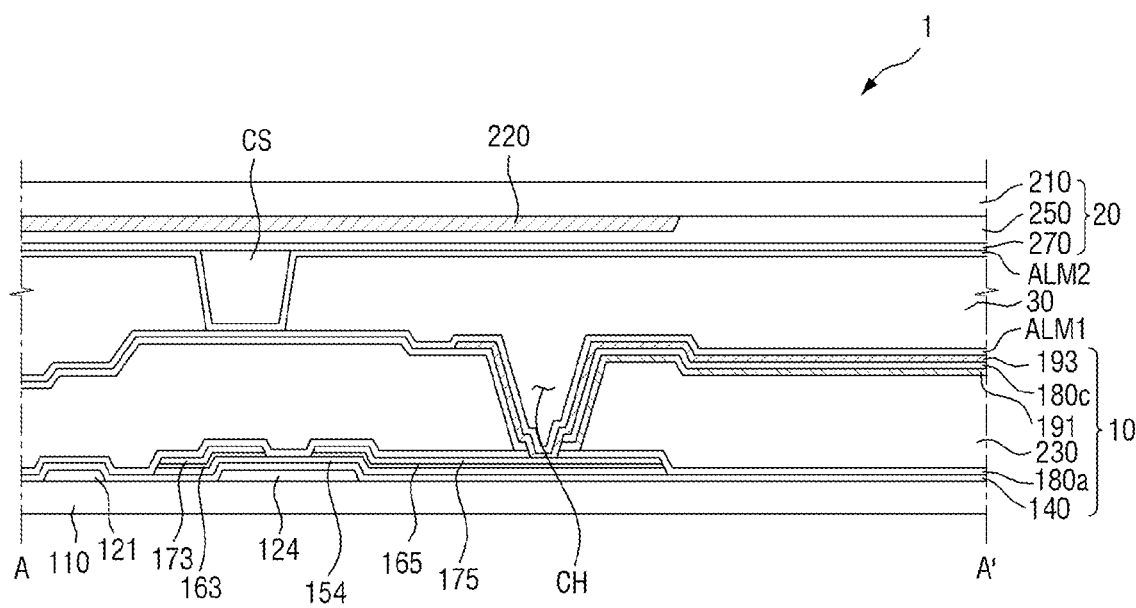
FIG. 2 is a cross-sectional view of the display device having the first substrate of FIG. 1, taken along line A-A' of FIG. 1.
Figure 3:
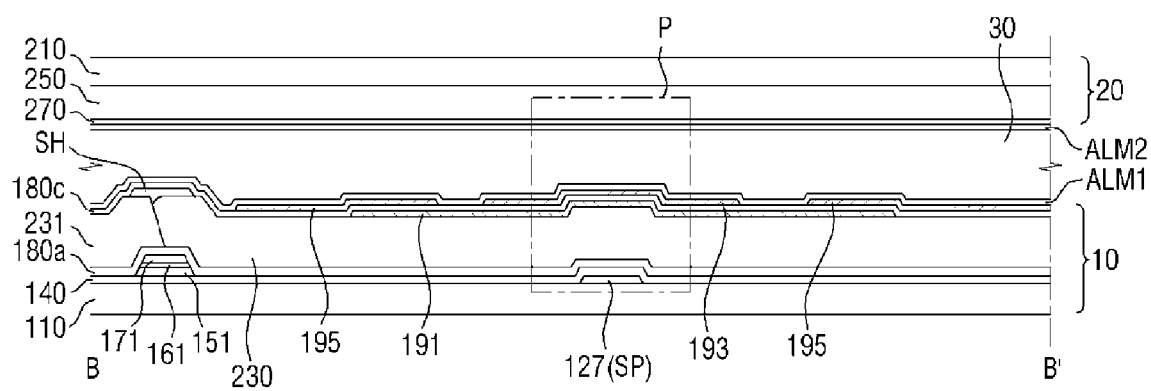
FIG. 3 is a cross-sectional view of the display device having the first substrate of FIG. 1, taken along line B-B' of FIG. 1.
Figure 4:
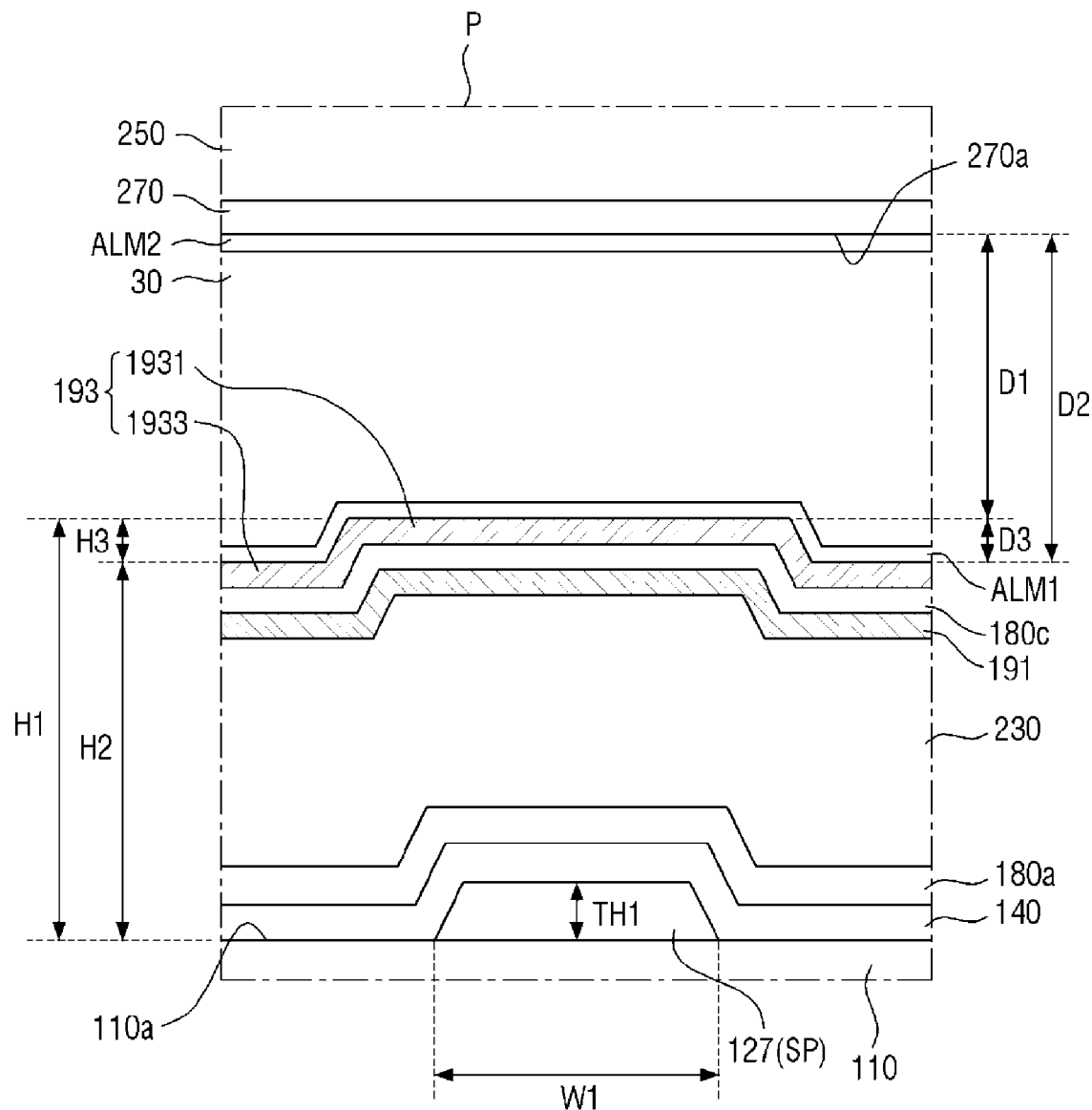
FIG. 4 is an enlarged cross-sectional view of a portion P of FIG. 3.

FIG. 1 is a plan view of a first substrate, and particularly, a pixel, of a display device according to an exemplary embodiment of the invention, FIG. 2 is a cross-sectional view of the display device having the first substrate of FIG. 1, taken along line A-A' of FIG. 1, FIG. 3 is a cross-sectional view of the display device having the first substrate of FIG. 1, taken along line B-B' of FIG. 1, and FIG. 4 is an enlarged cross-sectional view of a portion P of FIG. 3.

Referring to FIGS. 1 through 4, a display device 1 may include a first substrate 10, a second substrate 20, which faces the first substrate 10, and a liquid crystal layer 30, which is disposed between the first substrate 10 and the second substrate 20. The display device 1 may also include a pair of polarizers (not illustrated), which are respectively attached on the outer surfaces of the first substrate 10 and the second substrate 20.

In an exemplary embodiment, the first substrate 10 may be, for example, a thin-film transistor ("TFT") substrate on which TFTs, which are switching devices for driving liquid crystal molecules in the liquid crystal layer 30, are disposed. The first substrate 10 may include a gate line 121, a data line 171, a TFT, and a pixel electrode 190, which is at least partially located in a pixel area PEA. The pixel area PEA may account for a part of an area defined by the gate line 121 and the data line 171 intersecting each other.

The second substrate 20 may be an opposite substrate of the first substrate 10.

The liquid crystal layer 30 may include a plurality of liquid crystal molecules having dielectric anisotropy. The liquid crystal molecules may be vertical alignment ("VA")-mode liquid crystal molecules, which are vertically aligned between the first substrate 10 and the second substrate 20 in a perpendicular direction to the first substrate 10 and the second substrate 20. In response to an electric field being applied between the first substrate 10 and the second substrate 20, the liquid crystal molecules may rotate in a particular direction between the first substrate 10 and the second substrate 20, and may thus allow or block the transmission of light therethrough. The term "rotate", as used herein, may mean not only an actual rotation of the liquid crystal molecules, but also a change of the alignment of the liquid crystal molecules due to the electric field.

The first substrate 10 will hereinafter be described.

A first base substrate 110 may be an insulating substrate. In an exemplary embodiment, the first base substrate 110 may be a glass substrate, a quartz substrate, a transparent resin substrate, or the like, for example. In an exemplary embodiment, the first base substrate 110 may include a polymer or a plastic material with high thermal resistance, for example. In exemplary embodiments, the first base substrate 110 may have flexibility. That is, the first base substrate 110 may be deformable through rolling, folding or bending.

The gate line 121 and a gate electrode 124 may be disposed on a first surface of the first base substrate 110. The gate line 121 may transmit a gate signal and may extend substantially in a first direction (for example, a horizontal direction or an X-axis direction). The gate electrode 124 may protrude from, and may be connected to, the gate line 121. In an exemplary embodiment, the gate line 121 and the gate electrode 124 may include an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), tantalum (Ta), titanium (Ti), or the like, for example. In an exemplary embodiment, the gate line 121 and the gate electrode 124 may have a single-layer structure or may have a multilayer structure including two conductive films having different physical properties, wherein one of the two conductive films may include a low-resistance metal, for example, an Al-based metal, an Ag-based metal, a Cu-based metal, or the like, so as to reduce signal delays or voltage drops in the gate wiring GL and GE, and another conductive film may include a material with excellent contact properties with respect to indium tin oxide ("ITO") and indium zinc oxide ("IZO"), such as a Mo-based metal, Cr, Ti, Ta, or the like. Examples of the multilayer structure of the gate line 121 and the gate electrode 124 include the combination of a Cr lower film and an Al upper film and the combination of an Al lower film and a Mo upper film, but the invention is not limited thereto. That is, the gate line 121 and the gate electrode 124 may be provided using various metals and conductors other than those set forth herein.

A protruding portion SP may also be disposed on the first base substrate 110, and the protruding portion SP may be located in the pixel area PEA. Due to the presence of the protruding portion SP, a stepped portion may be generated on each element disposed on the protruding portion SP. More specifically, a stepped portion may be provided on a second sub-pixel electrode 193 due to the protruding portion SP, and as a result, the pixel area PEA may be divided into a plurality of domains due to the stepped portion of the second sub-pixel electrode 193.

Figure 5:
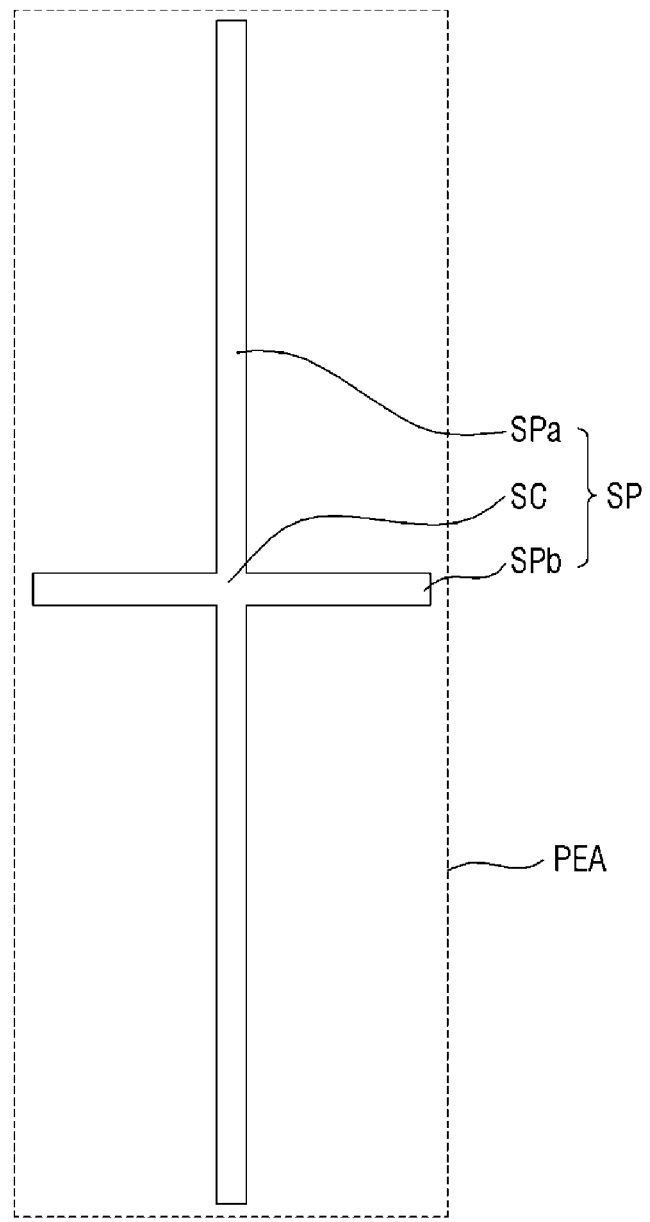
FIG. 5 is a plan view of a protruding portion included in the first substrate of FIG. 1.

FIG. 5 is a plan view of the protruding portion SP included in the first substrate 10 of FIG. 1. Referring to FIGS. 1 through 5, the protruding portion SP may have a cross shape, including a horizontal stem portion SPa and a vertical stem portion SPb, in a plan view, and a center SC of the protruding portion SP may coincide with the center of the pixel area PEA, in which case, the pixel area PEA may be divided into four domains.

Referring back to FIGS. 1 through 4, the protruding portion SP may include a protruding pattern 127. In an exemplary embodiment, the protruding pattern 127 may be cross-shaped in a plan view, for example. The protruding pattern 127 may be disposed on the same layer as the gate line 121 and the gate electrode 124. In an exemplary embodiment, in response to the gate line 121 and the gate electrode 124 being disposed directly on the first surface of the first base substrate 110, the protruding pattern 127 may also be disposed directly on the first surface of the first base substrate 110, for example. The protruding pattern 127 may include the same material as that of the gate line 121 and the gate electrode 124. In exemplary embodiments, the protruding pattern 127, the gate line 121, and the gate electrode 124 may be provided by a single-mask process. The term "single-mask process", as used herein, may denote a single photolithography process using a single mask. In exemplary embodiments, the protruding pattern 127 may be electrically and physically isolated from the gate line 121 and the gate electrode 124. When the protruding pattern 127 is electrically isolated from the gate line 121 and the gate electrode 124, a signal provided to the gate line 121 or the gate electrode 124 may not be directly transmitted to the protruding pattern 127. When the protruding pattern 127 is physically isolated from the gate line 121 and the gate electrode 124, the protruding pattern 127 may not be placed in direct contact with the gate line 121 and the gate electrode 124. However, the invention is not limited to these exemplary embodiments. The protruding pattern 127 may include an insulating material.

In exemplary embodiments, the protruding pattern 127 may have a sufficient width W1 of about 2 micrometers (μm) to about 10 μm to divide the pixel area PEA into a plurality of domains, and may have a thickness TH1 of about 0.3 µm to about 1.5 µm to reduce the formation of texture, for example.

A gate insulating layer 140 may be disposed on the gate line 121, the gate electrode 124, and the protruding pattern 127. The gate insulating layer 140 may include an insulating material, for example, an inorganic insulating material such as silicon nitride, silicon oxide, or silicon oxynitride. The gate insulating layer 140 may have a single-layer structure or may have a multilayer structure including two insulating films having different physical properties.

A semiconductor layer 154 may be disposed on the gate insulating layer 140 and may partially overlap the gate electrode 124. In an exemplary embodiment, the semiconductor layer 154 may include amorphous silicon, polycrystalline silicon, or an oxide semiconductor, for example.

A plurality of ohmic contact members 163 and 165 may be disposed on the semiconductor layer 154. The ohmic contact members 163 and 165 may include a source ohmic contact member 163, which is disposed below a source electrode 173, and a drain ohmic contact member 165, which is disposed below a drain electrode 175. In an exemplary embodiment, the ohmic contact members 163 and 165 may include n+ hydrogenated amorphous silicon doped with a high concentration of n-type impurities, or silicide, for example.

The source electrode 173, the drain electrode 175, and the data line 171 may be disposed on the source ohmic contact member 163, the drain ohmic contact member 165, and the gate insulating layer 140. The data line 171 may transmit a data voltage and may extend substantially in a second direction (for example, a vertical direction or a Y-axis direction), which intersects the first direction, so as to intersect the gate line 121. In exemplary embodiments, a semiconductor pattern 161 may be provided between the data line 171 and the gate insulating layer 140, and a data ohmic contact member 171 may be provided between the semiconductor pattern 151 and the data line 171. The semiconductor pattern 151 may include the same material as that of the semiconductor layer 154, and the data ohmic contact member 161 may include the same material as that of the source ohmic contact member 163 and the drain ohmic contact member 165.

In exemplary embodiments, in response to the semiconductor layer 154 and the semiconductor pattern 151 including an oxide semiconductor, the ohmic contact members 161, 163, and 165 may not be provided.

The source electrode 173 may be connected to the data line 171. In exemplary embodiments, the source electrode 173 may extend from the data line 171 to protrude above the top of the gate electrode 124.

The drain electrode 175 may be isolated from the source electrode 173 on the gate electrode 173. In exemplary embodiments, the drain electrode 175 may include a bar-shaped portion, which extends in substantially parallel to the source electrode 173, and an extended portion, which is on the opposite side of the drain electrode 175.

In an exemplary embodiment, the data line 171, the source electrode 173, and the drain electrode 175 may include Al, Cu, Ag, Mo, Cr, Ti, Ta, or an alloy thereof and may have a multilayer structure including a lower film (not illustrated) including a refractory metal and a low-resistance upper film (not illustrated) disposed on the lower film, but the invention is not limited thereto.

The gate electrode 124, the source electrode 173, and the drain electrode 175 may provide a TFT together with the semiconductor layer 154, and a channel of the TFT may be defined in the semiconductor layer 154, and particularly, between the source electrode 173 and the drain electrode 175.

A lower passivation layer 180a may be disposed on the gate insulating layer 140, the semiconductor layer 154, the source electrode 173, and the drain electrode 175. In an exemplary embodiment, the lower passivation layer 180a may include an inorganic insulating material such as silicon oxide, silicon nitride, or silicon oxynitride. The lower passivation layer 180a may protect the TFT and may prevent a material included in an insulating layer 230 from infiltrating into the semiconductor layer 154.

The insulating layer 230 may be disposed on the lower passivation layer 180a. The insulating layer 230 may include an organic material. In exemplary embodiments, the insulating layer 230 may include a photosensitive material.

The insulating layer 230 may further include a color pigment. In an exemplary embodiment, the insulating layer 230 may include a color pigment capable of allowing the transmission of light of a particular color wavelength therethrough, for example. That is, the insulating layer 230 may be a color filter. In an exemplary embodiment, the color filter may display, but is not limited to, one of primary colors such as red, green, and blue, for example. In an alternative exemplary embodiment, the color filter may display one of cyan, magenta, yellow, and white (or a whitish color), for example. In response to the insulating layer 230 comprising a color pigment, the insulating layer 230 may at least partially overlap an insulating layer 231 of a neighboring pixel over the data line 171, but the invention is not limited thereto. That is, the insulating layer 230 may not include any color pigment. In an alternative exemplary embodiment, a color filter may be additionally provided on the first substrate 10 or the second substrate 20.

Although not specifically illustrated in the drawings, a cover layer (not illustrated) may be additionally disposed on the insulating layer 230 in response to the insulating layer 230 being a color filter. The cover layer may prevent the ingredients of the color filter from infiltrating into elements disposed on the color filter, for example, the liquid crystal layer 30. The cover layer may be optional.

The pixel electrode 190 may be disposed on a part of the insulating layer 230 corresponding to the pixel area PEA. The pixel electrode 190 may include a first sub-pixel electrode 191, the second sub-pixel electrode 193, and a third sub-pixel electrode 195.

The first sub-pixel electrode 191 may be disposed on the insulating layer 230. In an exemplary embodiment, the first sub-pixel electrode 191 may include a transparent conductive material, for example, ITO or IZO.

Figure 6:
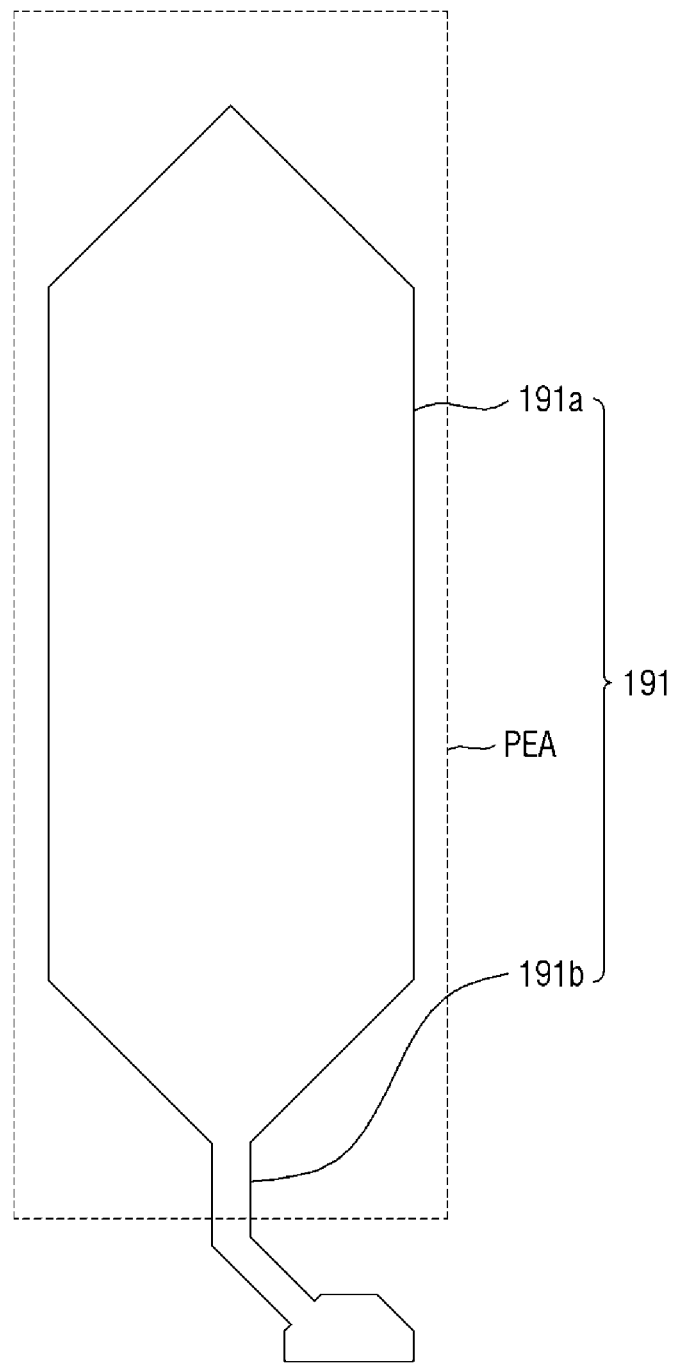
FIG. 6 is a plan view of a first sub-pixel electrode included in the first substrate of FIG. 1.

FIG. 6 is a plan view of the first sub-pixel electrode 191 included in the first substrate 10 of FIG. 1.

Referring to FIGS. 1 through 4 and 6, the first sub-pixel electrode 191 may include a first plate electrode 191a, which is located in the pixel area PEA, and a first connecting electrode 191b, which is connected to the first plate electrode 191a and extends outside the pixel area PEA.

For example, the first plate electrode 191a may be plate-shaped. The term "plate", as used herein, may denote a plate yet to be split. In an exemplary embodiment, the first plate substrate 191a may be hexagonal in a plan view, but the invention is not limited thereto, for example. That is, the first plate substrate 191a may be polygonal and may occupy a part of the pixel area PEA. In exemplary embodiments, the first plate electrode 191a may not include fine branch electrodes, and slits may not be defined between such fine branch electrodes.

The first connecting electrode 191b, which is connected to the first plate electrode 191a, may extend outside the pixel area PEA. The first connecting electrode 191b may be physically and electrically connected to the second sub-pixel electrode 193, and may be electrically connected to the drain electrode 175. In exemplary embodiments, a part of the first connecting electrode 191b in the pixel area PEA may be substantially in parallel to the data line 171.

Referring back to FIGS. 1 through 4, a passivation layer 180c may be disposed on the insulating layer 230 and the first sub-pixel electrode 191. In an exemplary embodiment, the passivation layer 180c may include an inorganic insulating material such as silicon oxide, silicon nitride, or silicon oxynitride. The passivation layer 180c may prevent the insulating layer 230 from being lifted off from the underlying layers and may suppress the contamination of the liquid crystal layer 30 by an organic material such as a solvent from the insulating layer 230, thereby preventing defects such as afterimages that may occur during the driving of the display device 1.

A contact hole CH may be defined in the lower passivation layer 180a, the insulating layer 230, and the passivation layer 180c to at least partially expose the TFT, for example, a part of the drain electrode 175, therethrough. A part of the first sub-pixel electrode 191, and particularly, a part of the first connecting electrode 191b (refer to FIG. 6) of the first sub-pixel electrode 191, may also be exposed through the contact hole CH.

The second sub-pixel electrode 193 and the third sub-pixel electrode 195, which is isolated from the second sub-pixel electrode 193, may be disposed on the passivation layer 180c. In an exemplary embodiment, the second sub-pixel electrode 193 and the third sub-pixel electrode 195 may include a transparent conductive material, for example, ITO or IZO. In exemplary embodiments, the second sub-pixel electrode 193 and the third sub-pixel electrode 195 may include the same material by a single mask process.

The second sub-pixel electrode 193 may be physically and electrically connected to the drain electrode 175 and the first sub-pixel electrode 191 via the contact hole CH. The first sub-pixel electrode 191 may be physically and electrically connected to the second sub-pixel electrode 193, and the first sub-pixel electrode 191 may be electrically connected to the drain electrode 175 via the second sub-pixel electrode 193. The expression "one element physically connected to another element", as used herein, may denote that the two elements are connected by being placed in direct contact with each other.

The second sub-pixel electrode 193 may be physically and electrically connected to the drain electrode 175 via the contact hole CH and may thus receive a data voltage from the drain electrode 175. As already mentioned above, since the second sub-pixel electrode 193 and the first sub-pixel electrode 191 are physically and electrically connected, the data voltage may also be applied to the first sub-pixel electrode 191. That is, the same voltage may be applied to the first sub-pixel electrode 191 and the second sub-pixel electrode 193.

The second sub-pixel electrode 193 may include a first portion 1931 and a second portion 1933. The first portion 1931 may be a portion of the second sub-pixel electrode 193 overlapping the protruding portion SP so as to protrude toward the second substrate 20 relative to the second portion 1933, and the second portion 1933 may be a portion of the second sub-pixel electrode 193 not overlapping the protruding portion SP. A first distance H1 from a first surface 110a of the first base substrate 110 to a first surface of the first portion 1931 may be larger than a second distance H2 from the first surface 110a of the first base substrate 110 to a first surface of the second portion 1933. That is, a height difference may be provided between the first portion 1931 and the second portion 1933. In exemplary embodiments, the height difference between the first portion 1931 and the second portion 1933, i.e., a difference H3 between the first distance H1 and the second distance H2, may range from about 0.3 μm to about 1.5 μm, for example.

Since the first portion 1931 protrudes toward the opposite substrate 20 relative to the second portion 1933, a first distance D1 between the first portion 1931 and a first surface 270a of the common electrode 270 may be less than a second distance D2 between the second portion 1933 and the first surface 270a of the common electrode 270. In exemplary embodiments, a difference D3 between the first distance D1 and the second distance D2 may range from about 0.3 μm to about 1.5 μm, for example.

The third sub-pixel electrode 195 may be physically isolated from the second sub-pixel electrode 193 and may be disposed adjacent to the second sub-pixel electrode 193 in a plan view. In exemplary embodiments, the third sub-pixel electrode 195 may not be physically connected to any electrode. That is, the third sub-pixel electrode 195 may be a floating electrode.

The area of the second sub-pixel electrode 193 and the area of the third sub-pixel electrode 195 may differ from each other. In exemplary embodiments, the third sub-pixel electrode 195 may have a larger area than the second sub-pixel electrode 193. The area of the third sub-pixel electrode 195 and the area of the second sub-pixel electrode 193 may be appropriately determined in consideration of the visibility and transmittance of the display device 1. In an exemplary embodiment, the area of the second sub-pixel electrode 193 may be about 40 percent (%) to about 80% of the area of the third sub-pixel electrode 195, for example, but the invention is not limited thereto.

Figure 7:
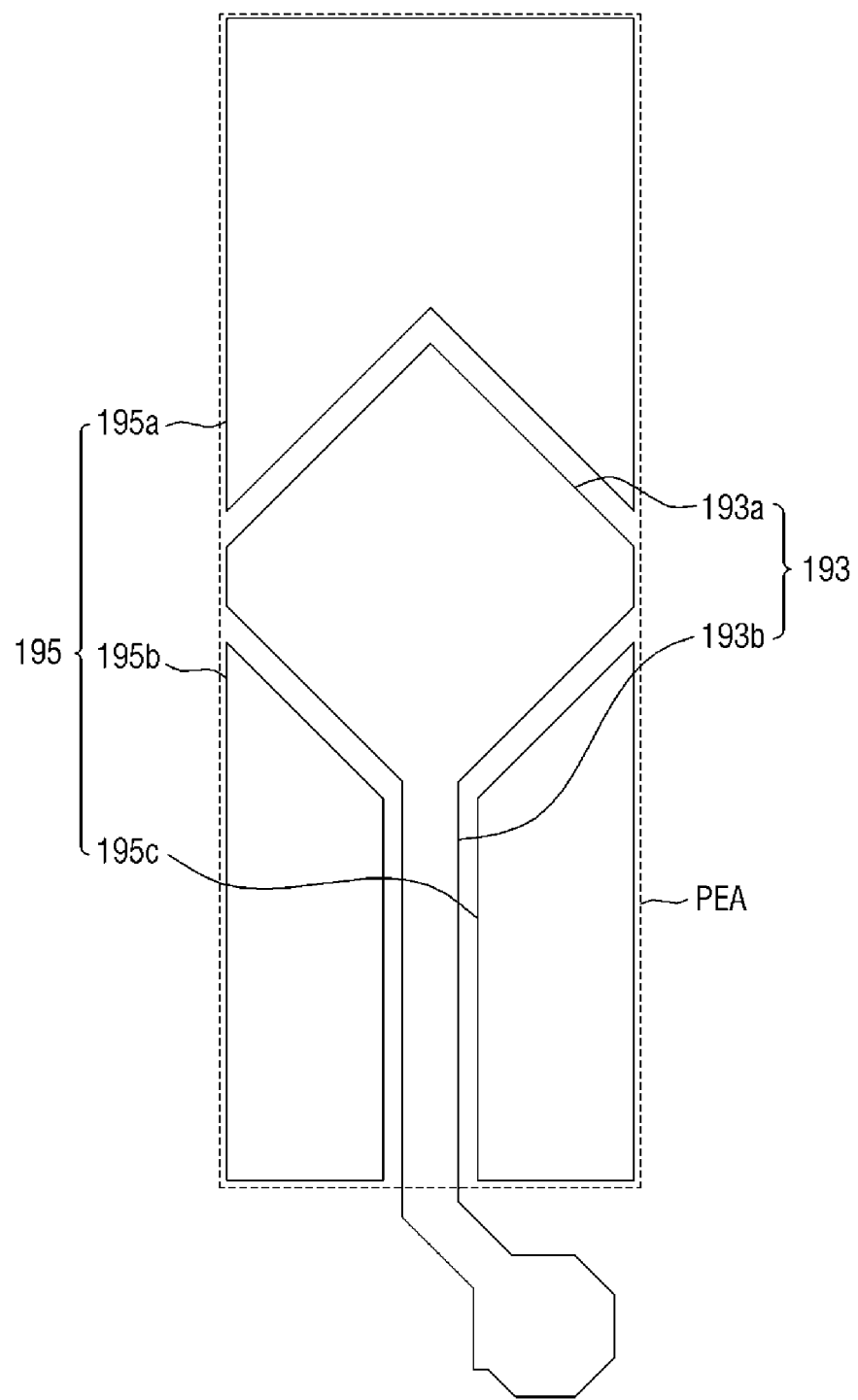
FIG. 7 is a plan view of a second sub-pixel electrode and a third sub-pixel electrode included in the first substrate of FIG. 1.

FIG. 7 is a plan view of the second sub-pixel electrode 193 and the third sub-pixel electrode 195 included in the first substrate 10 of FIG. 1.

Referring to FIGS. 1 through 4 and 7, the second sub-pixel electrode 193 may include a second plate electrode 193a, which is located in the pixel area PEA, and a second connecting electrode 193b, which is connected to the second plate electrode 193a and extends outside the pixel area PEA.

In an exemplary embodiment, the center of the second plate electrode 193a may substantially coincide with the center of the pixel area PEA, for example. In exemplary embodiments, the second plate electrode 193a may be plate-shaped without particular slits or branch electrodes. In an exemplary embodiment, the second plate electrode 193a may be polygonal in a plan view and may occupy a part of the pixel area PEA, for example. As illustrated in FIG. 1, the second plate electrode 193a may overlap the center SC of the protruding portion SP.

The second connecting electrode 193b, which is connected to the second plate electrode 193a, may extend outside the pixel area PEA. The second connecting electrode 193b may be physically and electrically connected to the drain electrode 175. Also, the second connecting electrode 193b may be physically and electrically connected to the first connecting electrode 191b (refer to FIG. 6) of the first sub-pixel electrode 191. In exemplary embodiments, a part of the second connecting electrode 193b in the pixel area PEA may be substantially in parallel to the data line 171.

The third sub-pixel electrode 195 may include a plurality of floating electrodes. In exemplary embodiments, the third sub-pixel electrode 195 may include a first floating electrode 195a, a second floating electrode 195b, and a third floating electrode 195c, and the first floating electrode 195a, the second floating electrode 195b, and the third floating electrode 195c may be isolated from one another.

The second floating electrode 195b and the third floating electrode 195c may be disposed on the outside of the second plate electrode 193a and the second connecting electrode 193b, and the first floating electrode 195a may be on the opposite side of the second floating electrode 195b and the third floating electrode 195c relative to the second plate electrode 193a.

In exemplary embodiments, the first floating electrode 195a, the second floating electrode 195b, and the third floating electrode 195c may be plate-shaped without particular slits or fine branch electrodes. The first floating electrode 195a, the second floating electrode 195b, and the third floating electrode 195c may be polygonal in a plan view and occupy a part of the pixel area PEA. The first floating electrode 195a, the second floating electrode 195b, and the third floating electrode 195c may surround a part of the periphery of the second sub-pixel electrode 193.

In exemplary embodiments, the second floating electrode 195b and the third floating electrode 195c may be symmetrical with respect to the second connecting electrode 193b.

It will hereinafter be described how the protruding portion SP, the first sub-pixel electrode 191, the second sub-pixel electrode 193, and the third sub-pixel electrode 195 overlap one another with reference to FIGS. 8 through 10.

Figure 8:
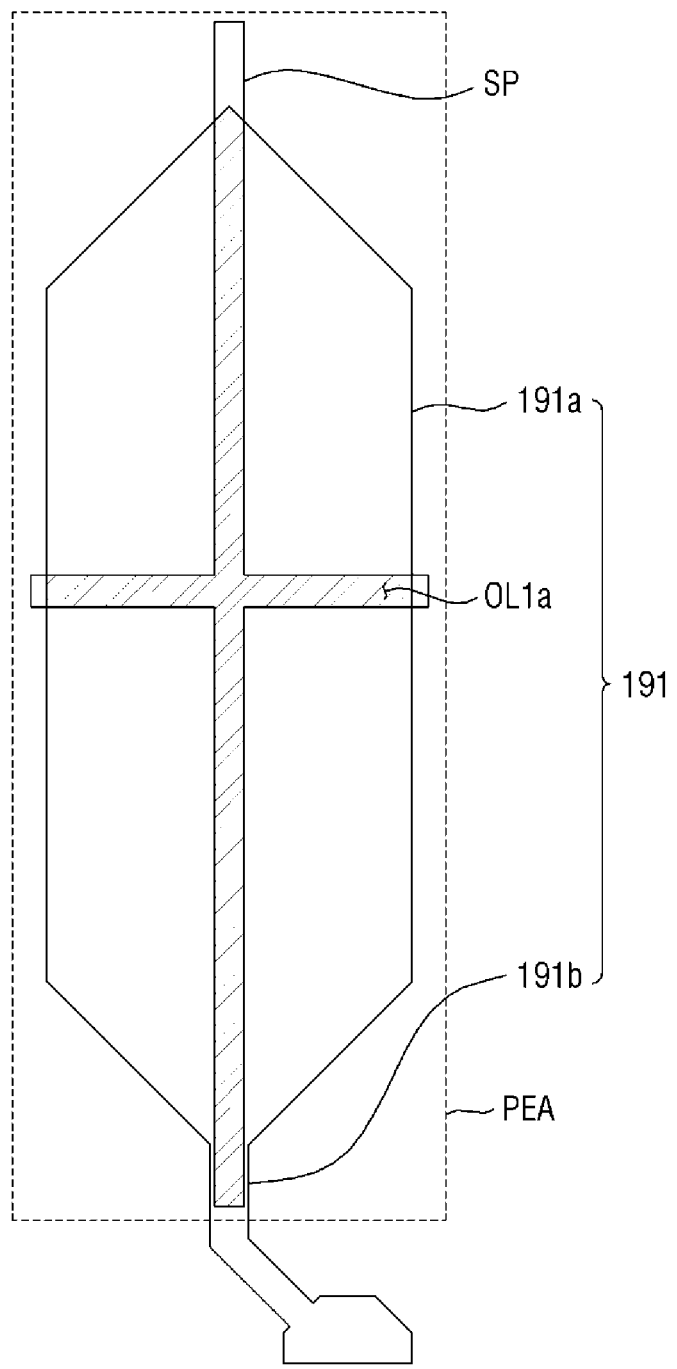
FIG. 8 is a plan view illustrating how the first sub-pixel electrode and the protruding portion included in the first substrate of FIG. 1 overlap each other.

FIG. 8 is a plan view illustrating how the first sub-pixel electrode 191 and the protruding portion SP included in the first substrate 10 of FIG. 1 overlap each other.

Referring to FIGS. 1 through 4 and 8, the first sub-pixel electrode 191 may have a portion (hereinafter, the first overlapping portion OL1a) overlapping the protruding portion SP. In an exemplary embodiment, in response to the first sub-pixel electrode 191 including the first plate electrode 191a and the first connecting electrode 191b, the first overlapping portion OL1a may be provided in the first plate electrode 191a and the first connecting electrode 191b, for example. In other words, the first plate electrode 191a may at least partially overlap the protruding portion SP, and the first connecting electrode 191b may also overlap the protruding portion SP. However, the invention is not limited thereto. That is, the location of the first overlapping portion OL1 may vary depending on the shape or size of the protruding portion SP. In an exemplary embodiment, the first overlapping portion OL1a may not be provided in the first connecting electrode 191b, for example. In other words, the protruding portion SP may overlap the first plate electrode 191a, but not the first connecting electrode 191b. The first overlapping portion OL1a of the first sub-pixel electrode 191 may protrude toward the second substrate 20 relative to the rest of the first sub-pixel electrode 191.

Figure 9:
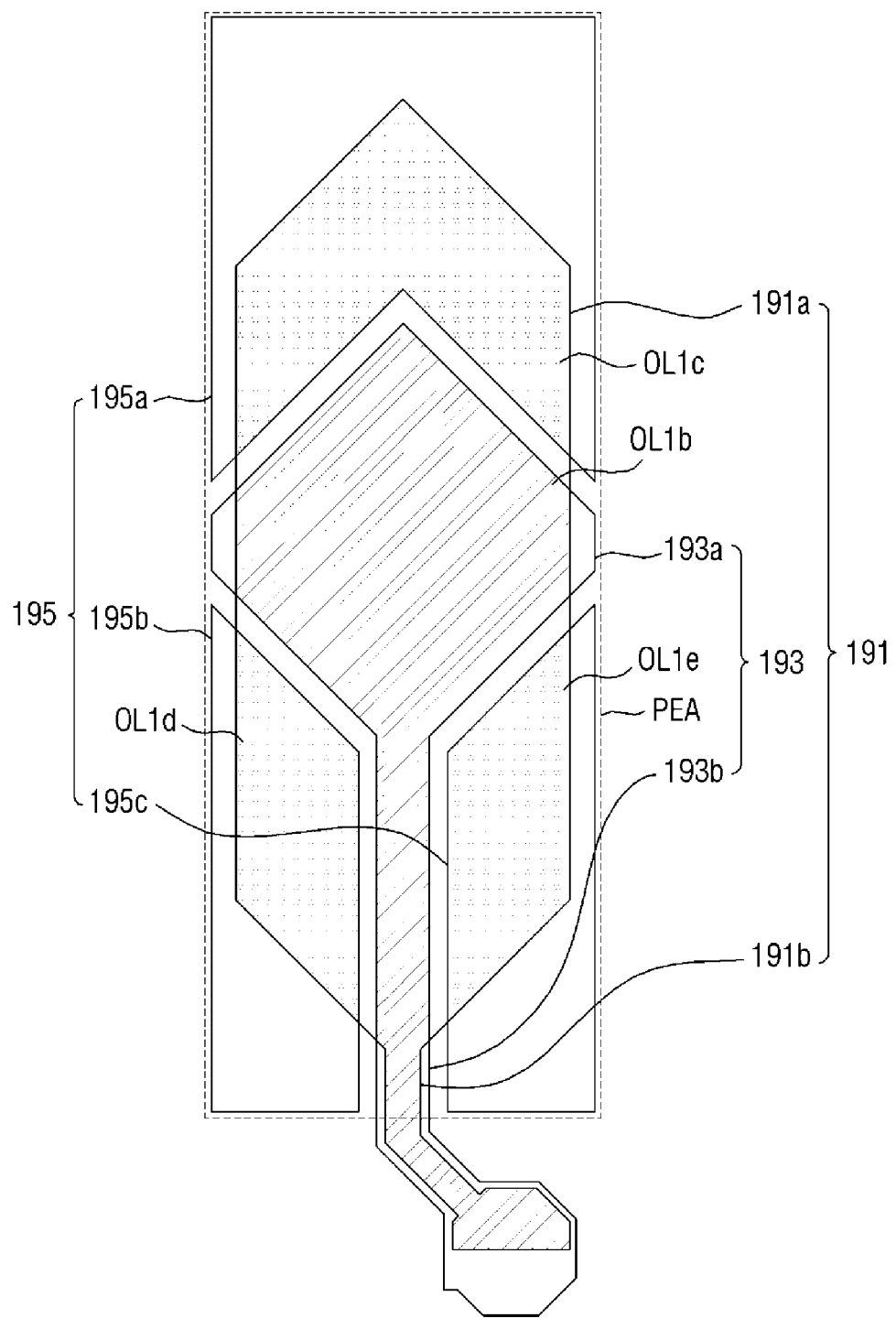
FIG. 9 is a plan view illustrating how the first sub-pixel electrode and the second sub-pixel electrode included in the first substrate of FIG. 1 overlap each other and how the first sub-pixel electrode and the third sub-pixel electrode included in the first substrate of FIG. 1 overlap each other.

FIG. 9 is a plan view illustrating how the first sub-pixel electrode 191 and the second sub-pixel electrode 193 included in the first substrate 10 of FIG. 1 overlap each other and how the first sub-pixel electrode 191 and the third sub-pixel electrode 195 included in the first substrate 10 of FIG. 1 overlap each other.

Referring to FIGS. 1 through 4 and 9, the first sub-pixel electrode 191 may have a portion (hereinafter, the second overlapping portion OL1b) overlapping the second sub-pixel electrode 193.

In an exemplary embodiment, in response to the first sub-pixel electrode 191 including the first plate electrode 191a and the first connecting electrode 191b and the second sub-pixel electrode 193 including the second plate electrode 193a and the second connecting electrode 193b, the second overlapping portion OL1b may be provided in the first plate electrode 191a and the first connecting electrode 191b, for example. A part of the second overlapping portion OL1b in the first plate electrode 191a may be a portion partially overlapping the second plate electrode 193a and the second connecting electrode 193b. In other words, the first plate electrode 191a and the second plate electrode 193a may partially overlap each other, and the first plate electrode 191a and the second connecting electrode 193b may partially overlap each other.

A part of the second overlapping portion OL1b in the first connecting electrode 191b may be a portion partially overlapping the second connecting electrode 193b. In other words, the first connecting electrode 191b and the second connecting electrode 193b may overlap each other. However, the invention is not limited thereto. That is, the location of the second overlapping portion OL1b may vary depending on the shape and the arrangement of the first sub-pixel electrode 191 and the second sub-pixel electrode 193.

The first sub-pixel electrode 191 may have a portion (hereinafter, the third overlapping portion OL1c, OL1d, and OL1e) overlapping the third sub-pixel electrode 195.

In an exemplary embodiment, in response to the first sub-pixel electrode 191 including the first plate electrode 191a and the first connecting electrode 191b and the third sub-pixel electrode 195 including the first floating electrode 195a, the second floating electrode 195b, and the third floating electrode 195c, the third overlapping portion OL1c, OL1d, and OL1e may include a first sub-overlapping portion OL1c, a second sub-overlapping portion OL1d, and a third sub-overlapping portion OL1e, for example. The first sub-overlapping portion OL1c may be a portion of the first plate electrode 191a overlapping the first floating electrode 195a, the second sub-overlapping portion OL1d may be a portion of the first plate electrode 191a overlapping the second floating electrode 195b, and the third sub-overlapping portion OL1e may be a portion of the first plate electrode 191a overlapping the third floating electrode 195c. In other words, the first plate electrode 191a and each of the first floating electrode 195a, the second floating electrode 195b, and the third floating electrode 195c may partially overlap each other. In exemplary embodiments, the third overlapping portion OL1c, OL1d, and OL1e may not be provided in the first connecting electrode 191b. In other words, the first connecting electrode 191b may not overlap the third sub-pixel electrode 195.

The ratio of the entire area of the third sub-pixel electrode 195 and the entire area of the third overlapping portion OL1c, OL1d, and OL1e may be determined in various manners, and by doing so, the level of a voltage provided to the third sub-pixel electrode 195 may be adjusted.

Figure 10:
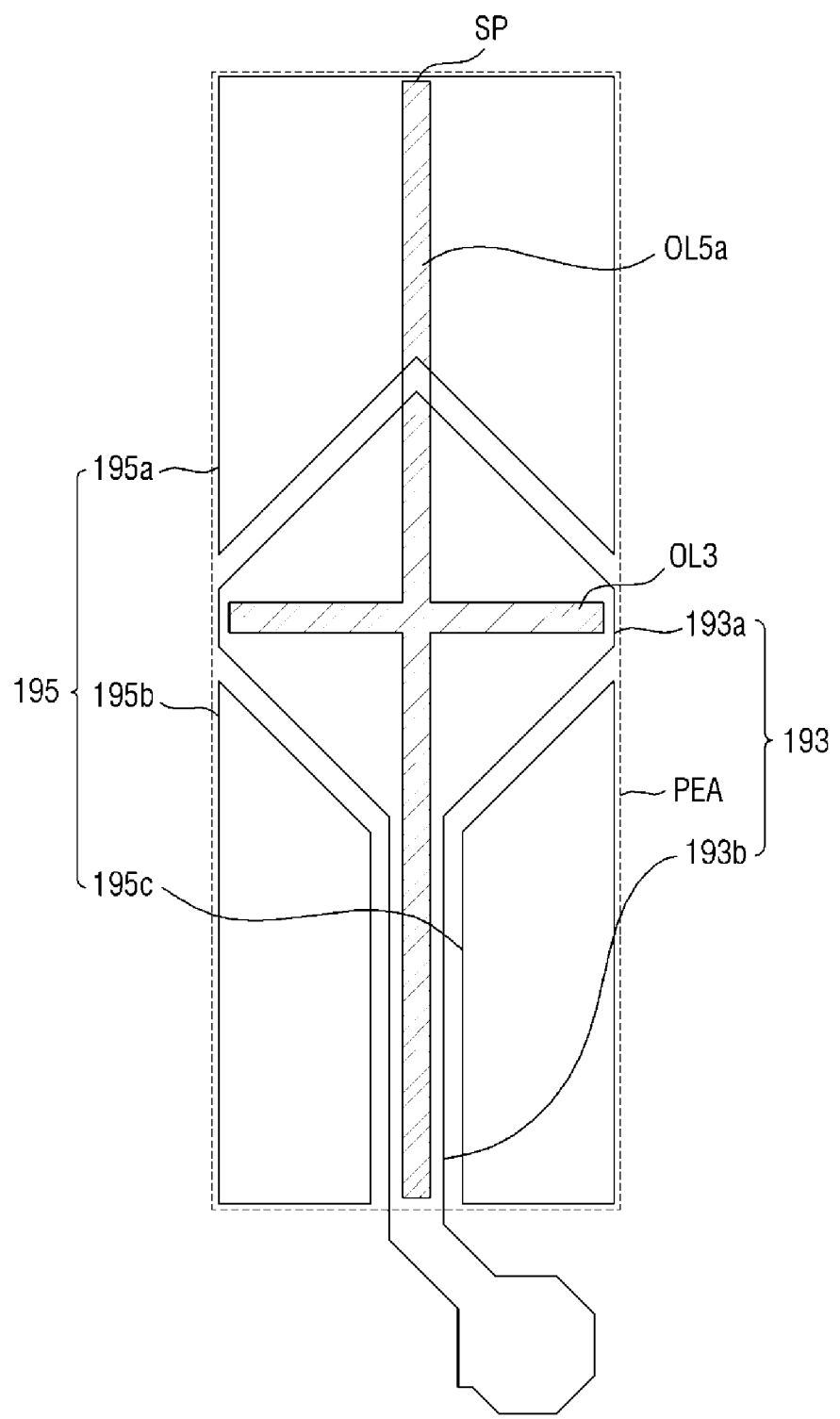
FIG. 10 is a plan view illustrating how the second sub-pixel electrode, the third sub-pixel electrode, and the protruding portion included in the first substrate of FIG. 1 overlap one another.

FIG. 10 is a plan view illustrating how the second sub-pixel electrode 193, the third sub-pixel electrode 105, and the protruding portion SP included in the first substrate 10 of FIG. 1 overlap one another.

Referring to FIGS. 1 through 4 and 10, the second sub-pixel electrode 193 may have a portion (hereinafter, the fourth overlapping portion OL3) overlapping the protruding portion SP. In an exemplary embodiment, in response to the second sub-pixel electrode 193 including the second plate electrode 193a and the second connecting electrode 193b, the fourth overlapping portion OL3 may be provided in the second plate electrode 193a and the second connecting electrode 193b, for example. In other words, the second plate electrode 193a may at least partially overlap the protruding portion SP, and the second connecting electrode 193b may overlap the protruding portion SP. However, the invention is not limited thereto. That is, the location of the fourth overlapping portion OL3 may vary depending on the shape or size of the protruding portion SP. In an exemplary embodiment, the fourth overlapping portion OL3 may not be provided in the second connecting electrode 193b, for example. In other words, the protruding portion SP may overlap the second plate electrode 193a, but not the second connecting electrode 193b. The fourth overlapping portion OL3 of the second sub-pixel electrode 193 may protrude toward the second substrate 20 relative to the rest of the second sub-pixel electrode 193. That is, the first portion 1931 (refer to FIG. 4) of the second sub-pixel electrode 193 may be substantially the same as, or may include, the fourth overlapping portion OL3. In exemplary embodiments, in response to the protruding portion SP being cross-shaped in a plan view, the first portion 1931 (refer to FIG. 4) may also be cross-shaped in a plan view, as illustrated in FIG. 10.

The third sub-pixel electrode 195 may have a portion (hereinafter, the fifth overlapping portion OL5a) overlapping the protruding portion SP. In response to the third sub-pixel electrode 195 including the first floating electrode 195a, the second floating electrode 195b, and the third floating electrode 195c, the fifth overlapping portion OL5a may be provided only in the first floating electrode 195a, but not in the second floating electrode 195b and the third floating electrode 195c. In other words, the first floating electrode 195a and the protruding portion SP may overlap each other, and the protruding portion SP and each of the second floating electrode 195b and the third floating electrode 195c may not overlap each other.

The fifth overlapping portion OL5a of the third sub-pixel electrode 195 may protrude toward the second substrate 20 relative to the rest of the third sub-pixel electrode 195.

Referring back to FIGS. 1 through 4, a shielding electrode SH may be further provided between the insulating layer 230 and the passivation layer 180c. The shielding electrode SH may be physically isolated from the first sub-pixel electrode 191, and may be disposed on the same layer as the first sub-pixel electrode 191. In exemplary embodiments, in response to the first sub-pixel electrode 191 being disposed directly on the insulating layer 230, the shielding electrode SH may also be disposed directly on the insulating layer 230 and may thus be placed in direct contact with the insulating layer 230. In an alternative exemplary embodiment, in response to an additional cover layer disposed on the insulating layer 230, the first sub-pixel electrode 191 and the shielding electrode SH may be disposed directly on the cover layer and may thus be placed in direct contact with the cover layer. The shielding electrode SH may include a transparent conductive material and may include the same material as that of the first sub-pixel electrode 191. In exemplary embodiments, the shielding electrode SH and the first sub-pixel electrode 191 may be provided at the same time by using a single mask.

The shielding electrode SH may be disposed on a part of the insulating layer 230 corresponding to the data line 171 and may overlap the data line 171. That is, the shielding electrode SH may be disposed above the data line 171 to overlap the data line 171 and may extend in the direction (for example, the vertical direction or the Y-axis direction of FIG. 1) in which the data line 171 extends.

In exemplary embodiments, the shielding electrode SH may completely cover the data line 171 in a plan view. In exemplary embodiments, a voltage with the same level as that of a common voltage, which is applied to the common electrode 270, may be applied to the shielding electrode SH.

An electric field generated between the pixel electrode 190 and the common electrode 270 may be relatively weak in an area between the data line 171 and the pixel electrode 190, and there may be a misalignment of liquid crystal molecules.

In the display device 1, a voltage of the same level as that of the common voltage, for example, the common voltage, may be applied to the shielding electrode SH. Accordingly, no electric field may be generated between the common electrode 270 and the shielding electrode SH. Thus, the probability of liquid crystal molecules being misaligned in an area near the data line 171 may be lowered, and light leakage may be reduced. Also, the area of a light shielding member 220 for preventing light leakage may be reduced, or the light shielding member 220 may not even be needed. Accordingly, the aperture ratio of the display device 1 may be further improved.

Also, the electric field generated between the data line 171 and the pixel electrode 190 may be weakened by the shielding electrode SH, and as a result, crosstalk may be suppressed.

A first alignment layer ALM1 may be further provided on the passivation layer 180c, the second sub-pixel electrode 193, and the third sub-pixel electrode 195. In exemplary embodiments, the first alignment layer ALM1 may be a vertical alignment layer and may include a photoreactive material.

The second substrate 20 will hereinafter be described.

The second substrate 20 may include a second base substrate 210, the light-shielding member 220, an overcoat layer 250, and the common electrode 270.

The second base substrate 210, like the first base substrate 110, may be an insulating substrate. The second base substrate 210 may include a polymer or a plastic material with high thermal resistance. In exemplary embodiments, the second base substrate 210 may have flexibility.

The light-shielding member 220 may be disposed on a first surface of the second base substrate 210 facing the first base substrate 110. In exemplary embodiments, the light-shielding member 220 may overlap the gate line 121 and the TFT, and may also overlap the contact hole CH. The light-shielding member 220 may include a light-shielding pigment such as black carbon or an opaque material such as Cr. However, the invention is not limited thereto. That is, in an alternative exemplary embodiment, the light-shielding member 220 may be provided on the first substrate 10.

The overcoat layer 250 may be disposed on the first surface of the second base substrate 210 and may cover the light-shielding member 220. The overcoat layer 250 may planarize a height difference provided by the light-shielding member 220. In exemplary embodiments, the overcoat layer 250 may not be provided.

The common electrode 270 may be disposed on the overcoat layer 250. In exemplary embodiments, in response to the overcoat layer 250 not being provided, the common electrode 270 may be disposed on the second base substrate 210 and the light-shielding member 220. In an exemplary embodiment, the common electrode 270 may include a transparent conductive material such as ITO or IZO. In exemplary embodiments, the common electrode 270 may be disposed on the entire surface of the second base substrate 210. In response to a common voltage being applied to the common electrode 270, the common electrode 270 may generate an electric field together with the pixel electrode 190. The alignment of the liquid crystal molecules in the liquid crystal layer 30 may vary according to the intensity of the electric field, and as a result, the optical transmittance of the display device 1 may be controlled.

A spacing member CS may be disposed on a first surface of the common electrode 270 facing the first substrate 10. The spacing member CS may protrude toward the first substrate 10 and may maintain the gap between the first substrate 10 and the second substrate 20 by being placed in contact with the first substrate 10, but the invention is not limited thereto. In an alternative exemplary embodiment, the spacing member CS may be provided on the first substrate 10. In exemplary embodiments, the spacing member CS may include an organic insulating material and may have photosensitivity.

A second alignment layer ALM2 may be disposed on the first surface of the common electrode 270 facing the first substrate 10 and on the spacing member CS. In exemplary embodiments, the second alignment layer ALM2 may be a vertical alignment layer and may include a photoreactive material.

In response to the pixel electrode 190 including a plurality of branch electrodes or slits that are spaced at intervals of several micrometers and are defined in the pixel electrode 190, a fine patterning process for providing the branch electrodes or the slits may be inevitably performed. During the fine patterning process, stress may be applied to the underlying layers of the pixel electrode 190 (for example, the passivation layer 180c), and the refractive index or transmittance of the underlying layers of the pixel electrode 190 (for example, the passivation layer 180c) may partially change due to the stress. As a result, the display quality of the display device 1 may be lowered. In the exemplary embodiment, the pixel electrode 190 including the first sub-pixel electrode 191 and the second sub-pixel electrode 193 does not have branch electrodes or slits spaced at intervals of several micrometers are not defined in the second sub-pixel electrode 193, and the stress applied to the underlying layers of the pixel electrode 190 (for example, the passivation layer 180c) may be lowered. As a result, the display quality of the display device 1 may be prevented from decreasing.

Figure 11:
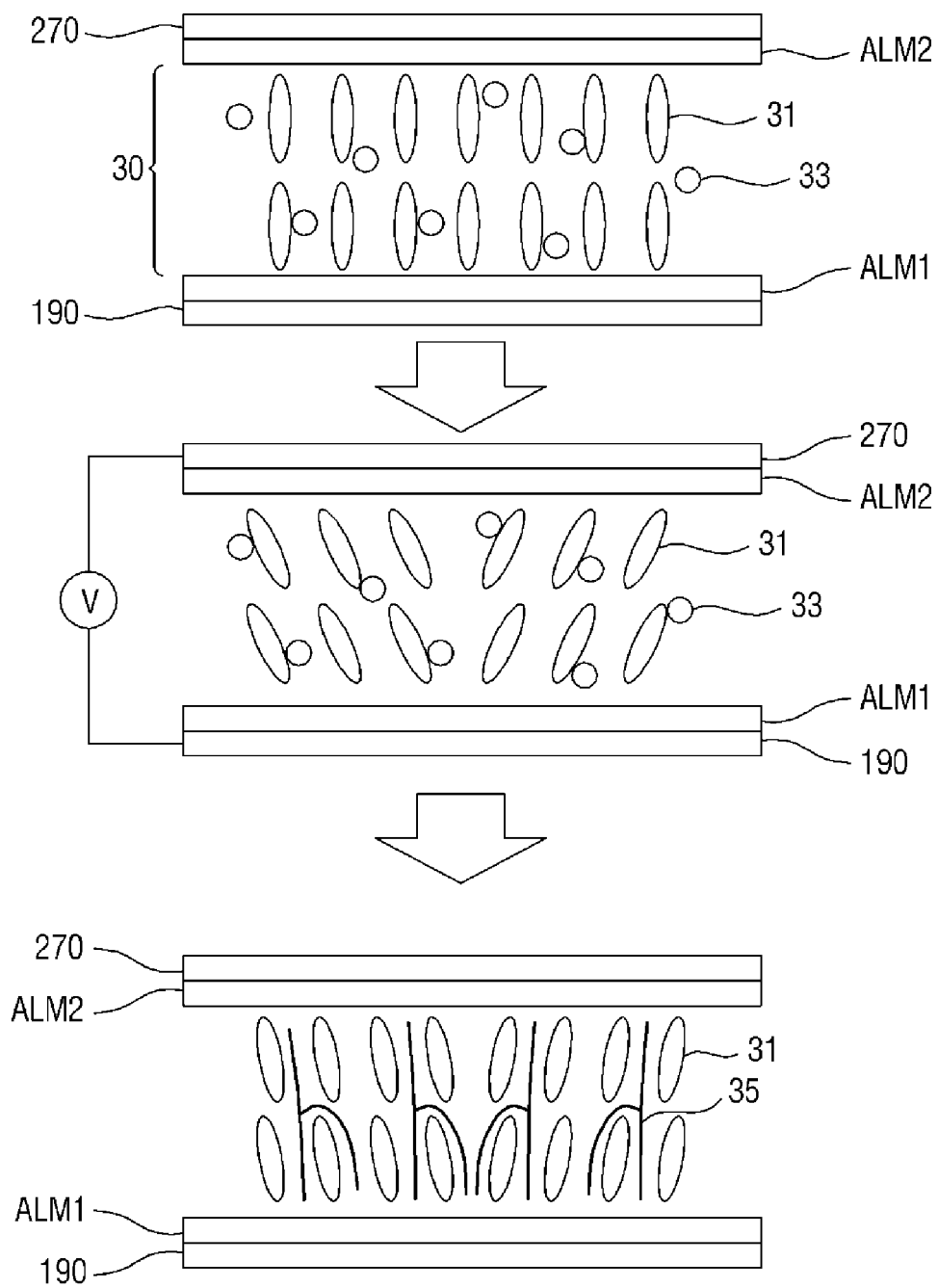
FIG. 11 is a cross-sectional view illustrating a process of making liquid crystal molecules have a pretilt angle using a prepolymer, which can be polymerized by light such as ultraviolet ("UV") light.

FIG. 11 is a cross-sectional view illustrating a process of making liquid crystal molecules have a pretilt angle using a prepolymer, which can be polymerized by light such as ultraviolet ("UV") light.

Referring to FIG. 11, a prepolymer 33 is injected between the first substrate 10 (refer to FIGS. 2 and 3) and the second substrate 20 (refer to FIGS. 2 and 3), and particularly, between the common electrode 270 and the pixel electrode 190, together with a liquid crystal material. The prepolymer 33 may be a reactive mesogen that causes a polymerization reaction upon exposure to light such as UV light.

Thereafter, a data voltage is applied to the pixel electrode 190, and a common voltage is applied to the common electrode 270, thereby generating an electric field between the pixel electrode 190 and the common electrode 270. The electric field, which is generated between the pixel electrode 190 and the common electrode 270, may be applied to the liquid crystal layer 30, and liquid crystal molecules 31 in the liquid crystal layer 30 may be tilted in a particular direction in response to the electric field.

If light such as UV light is irradiated with the liquid crystal molecules 31 in the liquid crystal layer 30 tilted in the particular direction, the prepolymer 33 may cause a polymerization reaction, and as a result, a pretilt-providing polymer 35 may be provided. Due to the pretilt-providing polymer 35, the alignment direction of the liquid crystal molecules 31 may be determined such that the liquid crystal molecules 31 may have a pretilt angle in a particular direction (for example, a direction toward the protruding portion SP). Accordingly, the liquid crystal molecules 31 may be aligned to have a pretilt angle even when no voltage is applied to the pixel electrode 190 and the common electrode 270.

Figure 12:
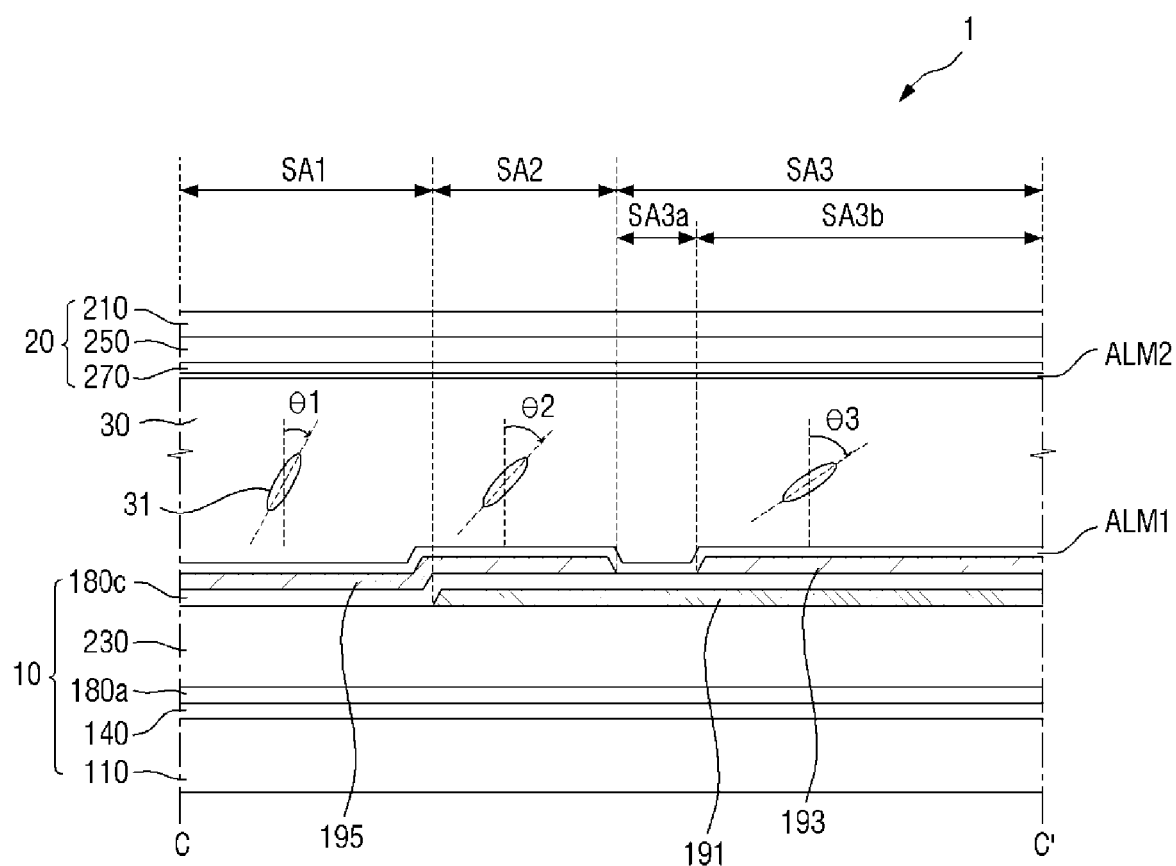
FIG. 12 is a cross-sectional view of the display device having the first substrate FIG. 1, taken along line C-C' of FIG. 1.

FIG. 12 is a cross-sectional view of the display device 1 having the first substrate 10 of FIG. 1, taken along line C-C' of FIG. 1.

Referring to FIGS. 1 through 4 and 12, the pixel area PEA may be divided into four areas (or four domains) by the protruding portion SP. The four areas may include an area (hereinafter, the first area SA1) in which the first sub-pixel electrode 191 and the third sub-pixel electrode 195 do not overlap each other with respect to the third sub-pixel electrode 195, an area (hereinafter, the second area SA2) in which the first sub-pixel electrode 191 and the third sub-pixel electrode 195 overlap each other, and an area (hereinafter, the third area SA3) which accounts for the pixel area PEA excluding the first area SA1 and the second area SA2. The third area SA3 may include an area SA3b in which the first sub-pixel electrode 191 and the second sub-pixel electrode 193 overlap each other and an area SA3a in which the second sub-pixel electrode 193 and the third sub-pixel electrode 195 do not overlap each other with respect to the first sub-pixel electrode 191.

A common voltage is applied to the common electrode 270. In response to the TFT, which includes the gate electrode 124, the semiconductor layer 154, the source electrode 173, and the drain electrode 175, being turned on, the same data voltage is applied to the first sub-pixel electrode 191 and the second sub-pixel electrode 193. The third sub-pixel electrode 195, which is floated, partially overlaps the first sub-pixel electrode 191, and thus, capacitance may be provided between the third sub-pixel electrode 195 and the first sub-pixel electrode 191 in the second area SA2. That is, a capacitor is disposed in the second area SA2, and has the third sub-pixel electrode 195 and the first sub-pixel electrode 191, which overlap each other, as both terminals thereof and has the passivation layer 180c as a dielectric element thereof. Accordingly, a voltage charged in the capacitor may be provided to the third sub-pixel electrode 191 in the second area SA2.

Since the third sub-pixel electrode 195 does not overlap the first sub-pixel electrode 191 in the first area SA1, a lower voltage is provided to a part of the third sub-pixel electrode 195 in the first area SA1 than in a part of the third sub-pixel electrode 195 in the second area SA2. Accordingly, the voltage provided to the a part of the third sub-pixel electrode 195 in the second area SA2 is lower than the data voltage applied to the first sub-pixel electrode 191 and the second sub-pixel electrode 193, and the voltage provided to the a part of the third sub-pixel electrode 195 in the first area SA1 is lower than the voltage provided to the a part of the third sub-pixel electrode 195 in the second area SA2.

The electric field generated between the common electrode 270 and the pixel electrode 190 may be weakest in the first area SA1 and may be strongest in the third area SA3. The electric field in the second area SA2 may be stronger than the electric field in the first area SA1 and may be weaker than the electric field in the third area SA3. That is, the intensity of the electric field provided to the liquid crystal molecules 31 in the first area SA1, the second area SA2 and the third area SA3 may differ from one another. Accordingly, a tilt angle θ1 of the liquid crystal molecules 31 in the first area SA1, a tilt angle θ2 of the liquid crystal molecules 31 in the second area SA2, and a tilt angle θ3 of the liquid crystal molecules 31 in the third area SA3 may differ from one another. More specifically, the tilt angle θ1 of the liquid crystal molecules 31 in the first area SA1 may be less than the tilt angle θ2 of the liquid crystal molecules 31 in the second area SA2, and the tilt angle θ2 of the liquid crystal molecules 31 in the second area SA2 may be less than the tilt angle θ3 of the liquid crystal molecules 31 in the third area SA3. Since the tilt angle of the liquid crystal molecules 31 varies from the first area SA1 to the second area SA2 to the third area SA3, the luminance of the pixel area PEA may vary from the first area SA1 to the second area SA2 to the third area SA3. Since the pixel area PEA is divided into a plurality of domains and each of the domains is divided into areas having different luminances, the side visibility of the display device 1 may be improved to be close to the front visibility of the display device 1.

In the area SA3b of the third area SA3 where the first sub-pixel electrode 191 and the second sub-pixel electrode 193 overlap each other, an electric field is generated between the second sub-pixel electrode 193 and the common electrode 270, and in the area SA3a of the third area SA3 where the first sub-pixel electrode 191 does not overlap the second sub-pixel electrode 193 and the third sub-pixel electrode 195, an electric field is generated between the first sub-pixel electrode 191 and the common electrode 270. The same data voltage may be applied to the second sub-pixel electrode 193 and the first sub-pixel electrode 191, but since the distance between the second sub-pixel electrode 193 and the common electrode 270 is less than the distance between the first sub-pixel electrode 191 and the common electrode 270, the electric field in the area SA3b of the third area SA3 where the first sub-pixel electrode 191 and the second sub-pixel electrode 193 overlap each other is stronger than the electric field in the area SA3a of the third area SA3 where the first sub-pixel electrode 191 does not overlap the second sub-pixel electrode 193 and the third sub-pixel electrode 195. Thus, the tilt angle of the liquid crystal molecules 31 of the area SA3a and the area SA3b of the third area SA3 may differ from each other. Accordingly, the side visibility of the display device 1 may be further improved.

Since in the display device 1, the same data voltage is applied to the first sub-pixel electrode 191 and the second sub-pixel electrode 193, there is no need for the first sub-pixel electrode 191 and the second sub-pixel electrode 193 to be isolated from each other in a plan view. Accordingly, a decrease in the transmittance of the display device 1 that may occur when there is a gap between the first sub-pixel electrode 191 and the second sub-pixel electrode 193 may be prevented.

In the description that follows, identical parts or elements as in the above-described exemplary embodiment are given identical reference numerals, and detailed descriptions thereof will be omitted to focus more on differences with the above-described exemplary embodiment.

Figure 13:
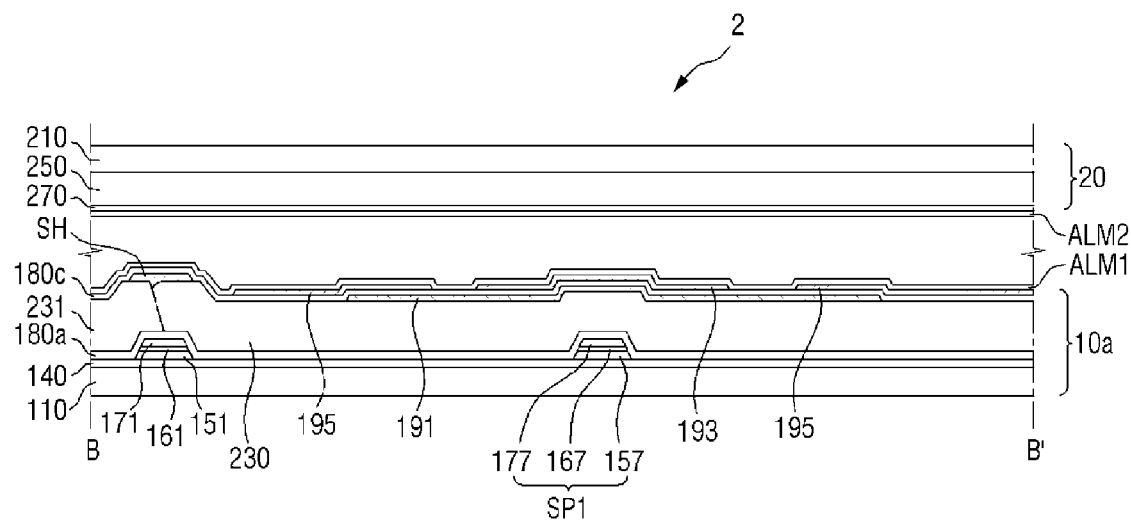
FIG. 13 is a cross-sectional view of an exemplary embodiment of the display device of FIG. 3.

FIG. 13 is a cross-sectional view of an exemplary embodiment of the display device 1 of FIG. 3.

Referring to FIG. 13, a display device 2 may be substantially identical, or at least similar, to from the display device 1 of FIGS. 1 through 4 except for a first substrate 10a, and particularly, a protruding portion SP1.

The protruding portion SP1 may be disposed between a first base substrate 110 and an insulating layer 230. In exemplary embodiments, the protruding portion SP1 may be disposed directly on the gate insulating layer 140 and between the gate insulating layer 140 and a lower passivation layer 180a.

The protruding portion SP1 may include a first protruding pattern 177, a second protruding pattern 167, and a third protruding pattern 157. The third protruding pattern 157 may be disposed directly on the gate insulating layer 140, the second protruding pattern 167 may be disposed directly on the third protruding pattern 157, and the first protruding pattern 177 may be disposed directly on the second protruding pattern 167. In an exemplary embodiment, the first protruding pattern 177, the second protruding pattern 167, and the third protruding pattern 157 may be cross-shaped in a plan view, for example.

The first protruding pattern 177 may be disposed on the same layer as that on which a data line 171, a source electrode 173, and a drain electrode 175 are disposed, and may include the same material as that of the data line 171, the source electrode 173, and the drain electrode 175. In exemplary embodiments, the first protruding pattern 177, the data line 171, the source electrode 173, and the drain electrode 175 may be provided by a single mask process. In exemplary embodiments, the first protruding pattern 177 may be electrically and physically isolated from the data line 171, the source electrode 173, and the drain electrode 175. In other words, the first protruding pattern 177 may not be electrically connected to the data line 171, the source electrode 173, and the drain electrode 175 and may also be physically isolated from the data line 171, the source electrode 173, and the drain electrode 175 without contacting the data line 171, the source electrode 173, and the drain electrode 175.

Similarly, the second protruding pattern 167 may be disposed on the same layer as that on which a source ohmic contact member 163 (refer to FIG. 2), a drain ohmic contact member 165 (refer to FIG. 2), and a data ohmic contact member 161 are disposed, and may include the same material as that of the source ohmic contact member 163, the drain ohmic contact member 165, and the data ohmic contact member 161. In exemplary embodiments, the second protruding pattern 167, the source ohmic contact member 163, the drain ohmic contact member 165, and the data ohmic contact member 161 may be provided by a single mask process, and the second protruding pattern 167 may be electrically and physically isolated from the source ohmic contact member 163, the drain ohmic contact member 165, and the data ohmic contact member 161.

Similarly, the third protruding pattern 157 may be disposed on the same level as that on which a semiconductor layer 154 (refer to FIG. 2) and a semiconductor pattern 151 are disposed, and may include the same material as that of the semiconductor layer 154 and the semiconductor pattern 151. In exemplary embodiments, the third protruding pattern 157, the semiconductor layer 154, and the semiconductor pattern 151 may be provided by a single mask process. In exemplary embodiments, the third protruding pattern 157 may be electrically and physically isolated from the semiconductor layer 154 and the semiconductor pattern 151. In response to the third protruding pattern 157 including an oxide semiconductor, the second protruding pattern 167 may not be provided.

At least one of the first protruding pattern 177, the second protruding pattern 167, and the third protruding pattern 157 included in the protruding portion SP1 may be optional. In an exemplary embodiment, the protruding portion SP1 may include only one or two selected from among the first protruding pattern 177, the second protruding pattern 167, and the third protruding pattern 157, for example.

Figure 14:
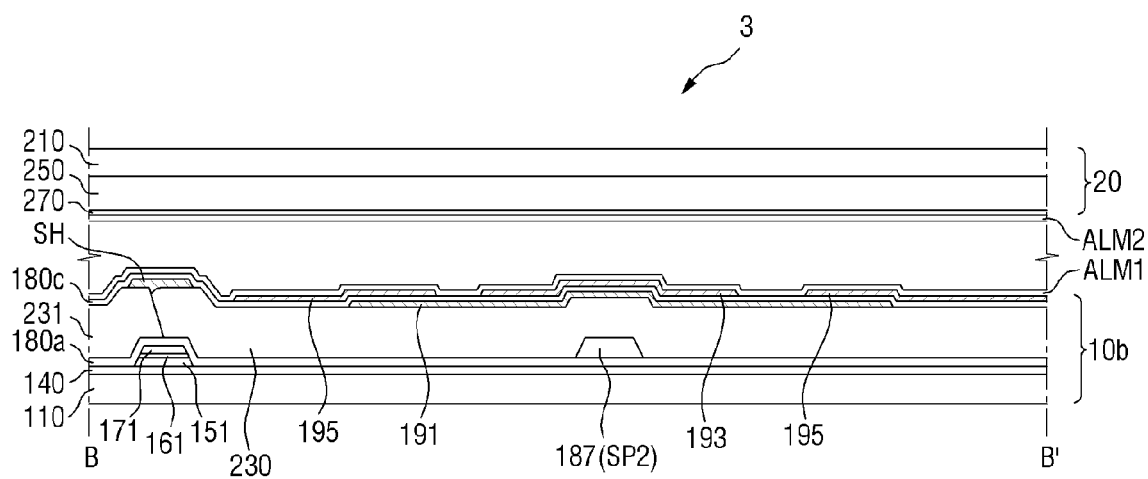
FIG. 14 is a cross-sectional view of another exemplary embodiment of the display device of FIG. 3.

FIG. 14 is a cross-sectional view of an exemplary embodiment of the display device 1 of FIG. 3.

Referring to FIG. 14, a display device 3 may be substantially identical, or at least similar, to from the display device 1 of FIGS. 1 through 4 except for a first substrate 10b, and particularly, a protruding portion SP2.

The protruding portion SP2 may be disposed between a first base substrate 110 and an insulating layer 230. In exemplary embodiments, the protruding portion SP2 may be disposed directly on a lower passivation layer 180a and between the lower passivation layer 180a and the insulating layer 230.

The protruding portion SP2 may include a protruding pattern 187, and the protruding pattern 187 may be cross-shaped in a plan view.

The protruding pattern 187 may include an insulating material, and the insulating material may be an organic insulating material or an inorganic insulating material.

In exemplary embodiments, the protruding pattern 187 may include an organic insulating material and may include a color pigment. In an exemplary embodiment, in response to the insulating layer 230 comprising a first color pigment, the protruding pattern 187 may include a second color pigment, which is different from the first color pigment, for example. In an exemplary embodiment, the second color pigment may be the same as a color pigment included in a neighboring insulating layer 231, in which case, the neighboring insulating layer 231 and the protruding pattern may be provided by a single mask process, for example. However, the invention is not limited thereto. That is, in an alternative exemplary embodiment, in response to the insulating layer 230 comprising the first color pigment, the protruding pattern 187 may also include the first color pigment.

In other exemplary embodiments, the protruding pattern 187 may include the same material as that of the lower passivation layer 180a and may be provided in one body with the lower passivation layer 180a. The material for providing the protruding pattern 187 is not particularly limited but may be varied.

Figure 15:
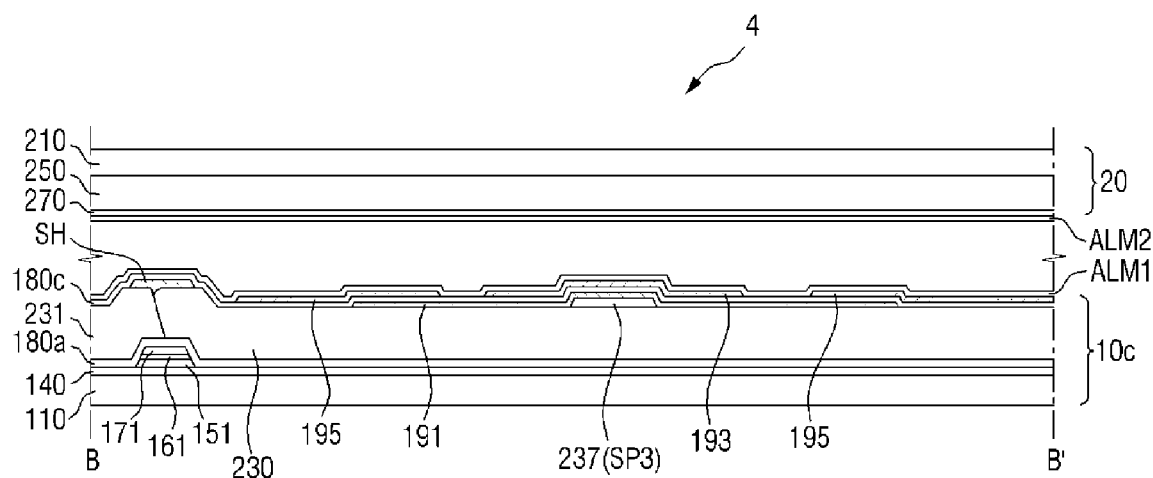
FIG. 15 is a cross-sectional view of another exemplary embodiment of the display device of FIG. 3.

FIG. 15 is a cross-sectional view of an exemplary embodiment of the display device 1 of FIG. 3.

Referring to FIG. 15, a display device 4 may be substantially identical, or at least similar, to from the display device 1 of FIGS. 1 through 4 except for a first substrate 10c, and particularly, a protruding portion SP3.

The protruding portion SP3 may be disposed on an insulating layer 230. In exemplary embodiments, the protruding portion SP3 may be disposed directly on the insulating layer 230 and between a passivation layer 180c and the insulating layer 230.

The protruding portion SP3 may include a protruding pattern 237, and the protruding pattern 237 may be cross-shaped in a plan view.

The protruding pattern 237 may include an insulating material, and the insulating material may be an organic insulating material or an inorganic insulating material.

In exemplary embodiments, the protruding pattern 237 may include an organic insulating material and may include a color pigment. In an exemplary embodiment, in response to the insulating layer 230 comprising a first color pigment, the protruding pattern 237 may also include the first color pigment, for example. In exemplary embodiments, the protruding pattern 237 may include the same material as that of the insulating layer 230 and may be provided in one body with the insulating layer 230. The insulating layer 230 and the protruding pattern 237 may be provided by a single photolithography process using a single mask such as a slit mask or a halftone mask.

Figure 16:
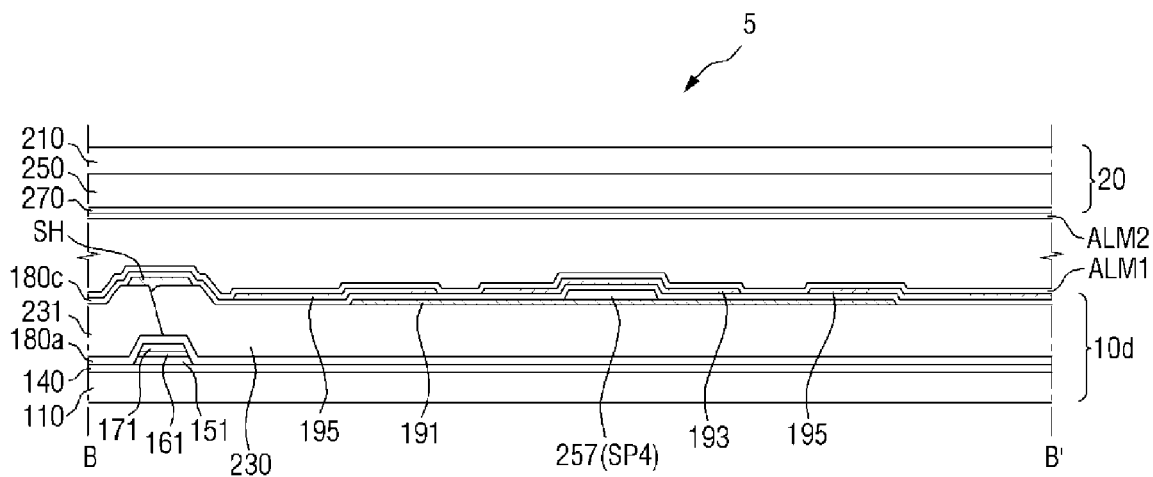
FIG. 16 is a cross-sectional view of another exemplary embodiment of the display device of FIG. 3.

FIG. 16 is a cross-sectional view of an exemplary embodiment of the display device 1 of FIG. 3.

FIG. 16 is a cross-sectional view of an exemplary embodiment of the display device 1 of FIG. 3.

Referring to FIG. 16, a display device 5 may be substantially identical, or at least similar, to from the display device 1 of FIGS. 1 through 4 except for a first substrate 10d, and particularly, a protruding portion SP4.

The protruding portion SP4 may be disposed below a passivation layer 180c. In exemplary embodiments, the protruding portion SP4 may be disposed directly below the passivation layer 180c and between the passivation layer 180c and a first sub-pixel electrode 191.

The protruding portion SP4 may include a protruding pattern 257, and the protruding pattern 257 may be cross-shaped in a plan view.

The protruding pattern 257 may include an insulating material, and the insulating material may be an organic insulating material or an inorganic insulating material. In an alternative exemplary embodiment, the protruding pattern 257 may include a transparent conductive material. In exemplary embodiments, the protruding pattern 257 may include the same material as that of the passivation layer 180c and may be provided in one body with the passivation layer 180c.

Figure 17:
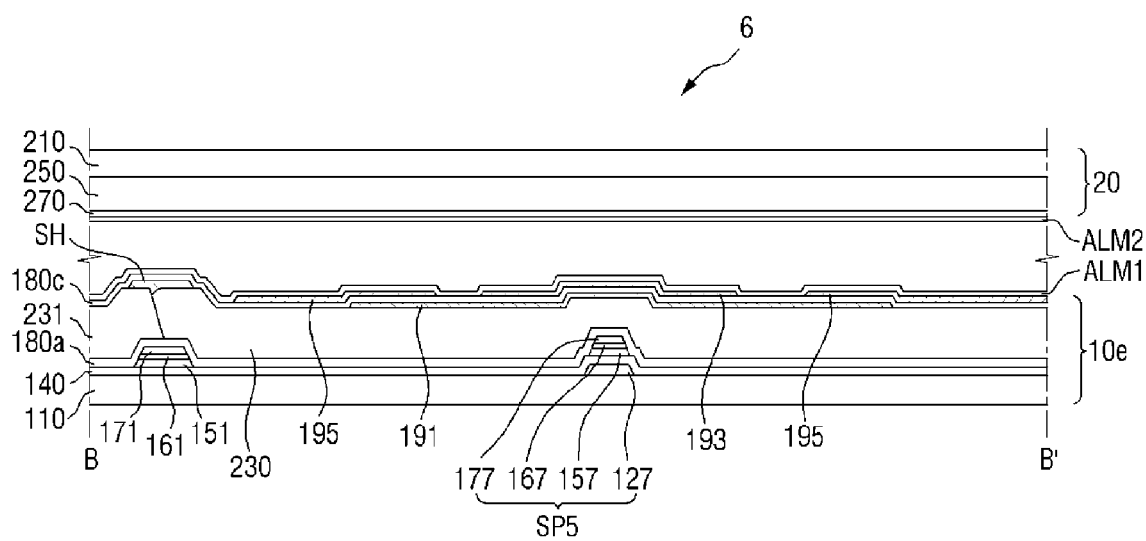
FIG. 17 is a cross-sectional view of another exemplary embodiment of the display device of FIG. 3.

FIG. 17 is a cross-sectional view of an exemplary embodiment of the display device 1 of FIG. 3.

Referring to FIG. 17, a display device 6 may be substantially identical, or at least similar, to from the display device 1 of FIGS. 1 through 4 except for a first substrate 10e, and particularly, a protruding portion SP5.

The protruding portion SP5 may be a combination of the protruding portion SP of FIG. 3 and the protruding portion SP1 of FIG. 13. In an exemplary embodiment, the protruding portion SP5 may include at least one selected from among a first protruding pattern 171, a second protruding pattern 161, and a third protruding pattern 151, which are disposed between a gate insulating layer 140 and a lower passivation layer 180a, and a protruding pattern 127, which is disposed between a first base substrate 110 and the gate insulating layer 140, for example.

The protruding portion SP of the display device 1 may have various shapes, other than those set forth herein. In an exemplary embodiment, the protruding portion SP of the display device 1 may be a combination of at least two selected from among the protruding portion SP of FIG. 3, the protruding portion SP1 of FIG. 13, the protruding portion SP2 of FIG. 14, the protruding portion SP3 of FIG. 15, and the protruding portion SP4 of FIG. 16, for example.

Figure 18:
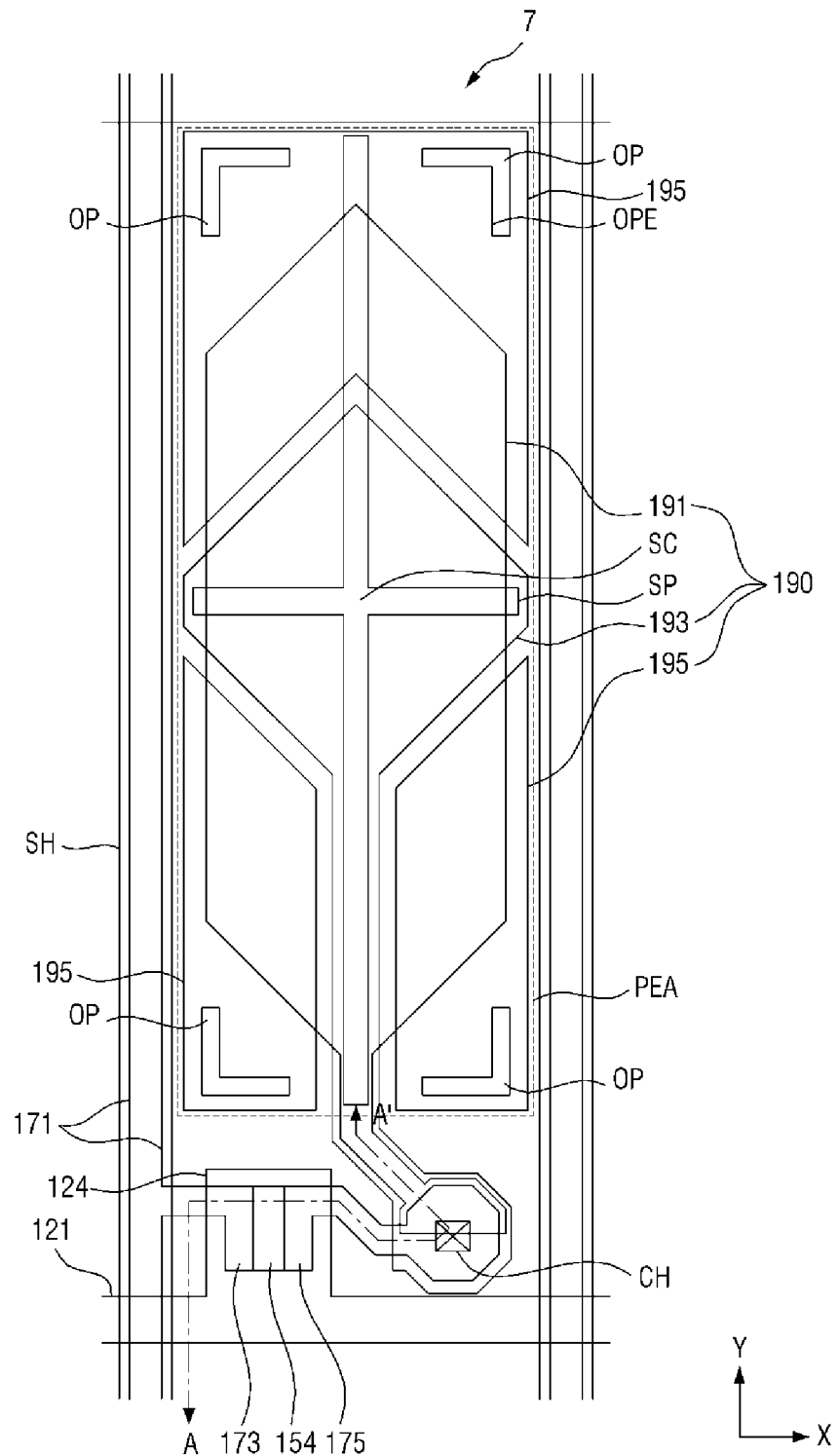
FIG. 18 is a plan view of a first substrate, and particularly, a pixel, of a display device according to another exemplary embodiment of the invention.

FIG. 18 is a plan view of a first substrate, and particularly, a pixel, of a display device according to another exemplary embodiment of the invention.

Referring to FIG. 18, a display device 7 may be substantially identical, or at least similar, to from the display device 1 of FIGS. 1 through 12 except that openings OP are defined in a third sub-pixel electrode 195, and thus will hereinafter be described, focusing mainly on differences with the display device 1 of FIGS. 1 through 12.

The openings OP may be defined along the edges of a pixel electrode 190 disposed in a pixel area PEA, and particularly, along the edges of the third sub-pixel electrode 195. More than one opening OP may be defined to provide symmetry with respect to a protruding portion SP, which is cross-shaped. In exemplary embodiments, inner sides OPE of each of the openings OP may define a closed loop in a plan view.

In response to a common voltage being applied to a common electrode 270 and a voltage being applied to the third sub-pixel electrode 195, no fringe field may be generated in areas where the openings OP are defined. Accordingly, the intensity of a fringe field applied to the edges of the pixel electrode 190 may be controlled through the openings OP. When liquid crystal molecules along the edges of the pixel electrode 190 are tilted perpendicularly to the edges of the pixel electrode 190, the display quality of the display device 7 may deteriorate. However, since in the display device 7, the openings OP are defined, the intensity of a fringe field applied to the edges of the pixel electrode 190 may be controlled, and as a result, the deterioration of the display quality of the display device 7 may be prevented.

Figure 19:
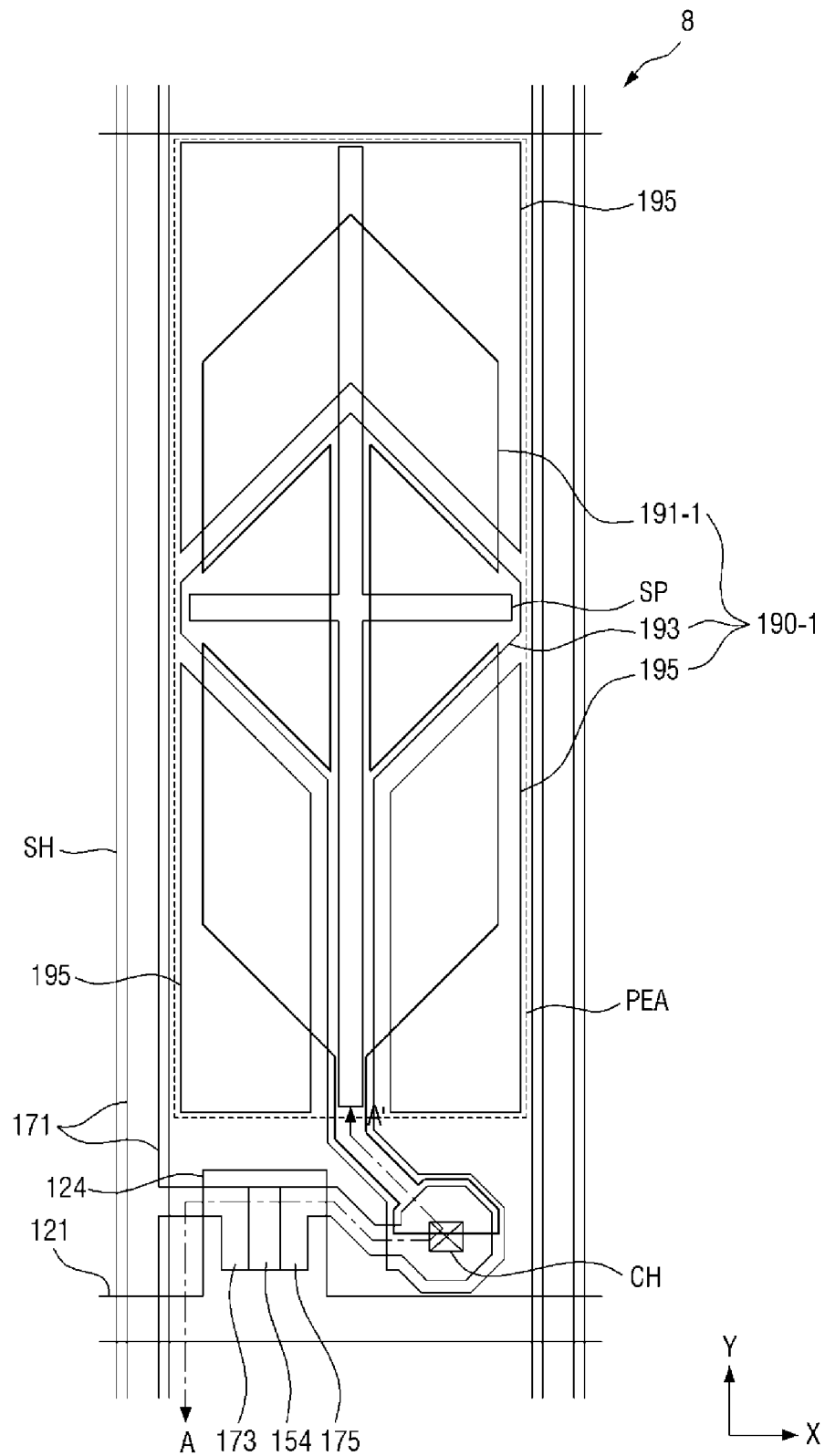
FIG. 19 is a plan view of a first substrate, and particularly, a pixel, of a display device according to another exemplary embodiment of the invention.
Figure 20:
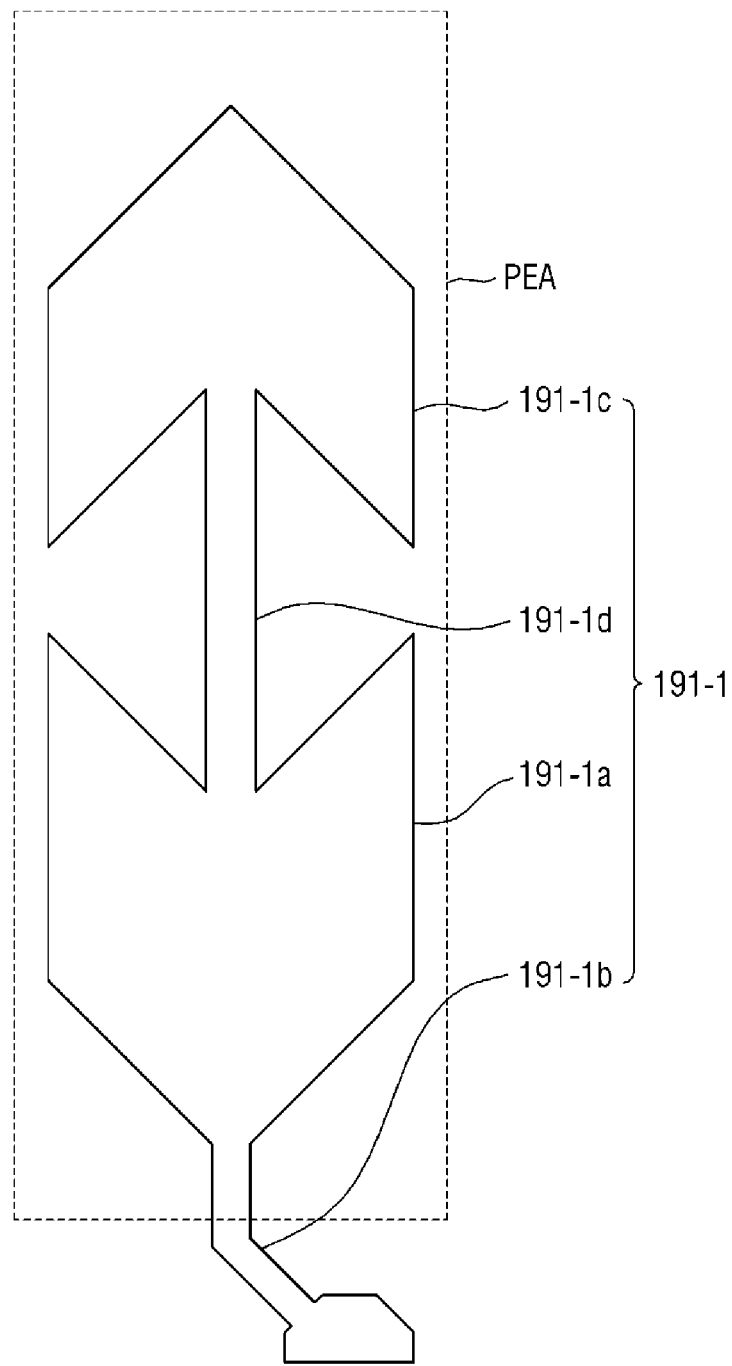
FIG. 20 is a plan view of a first sub-pixel electrode included in the first substrate of FIG. 19.
Figure 21:
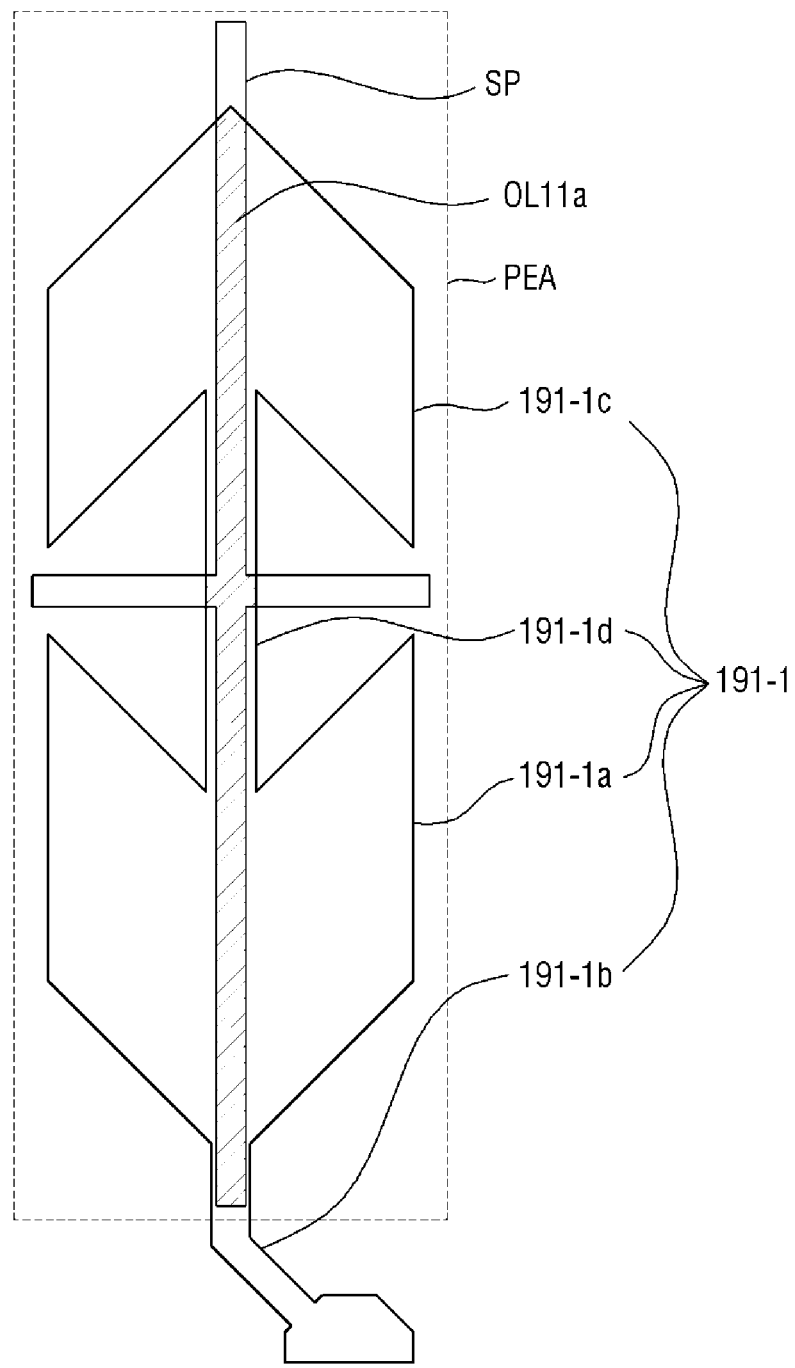
FIG. 21 is a plan view illustrating how the first sub-pixel electrode and a protruding portion included in the first substrate of FIG. 19 overlap each other.
Figure 22:
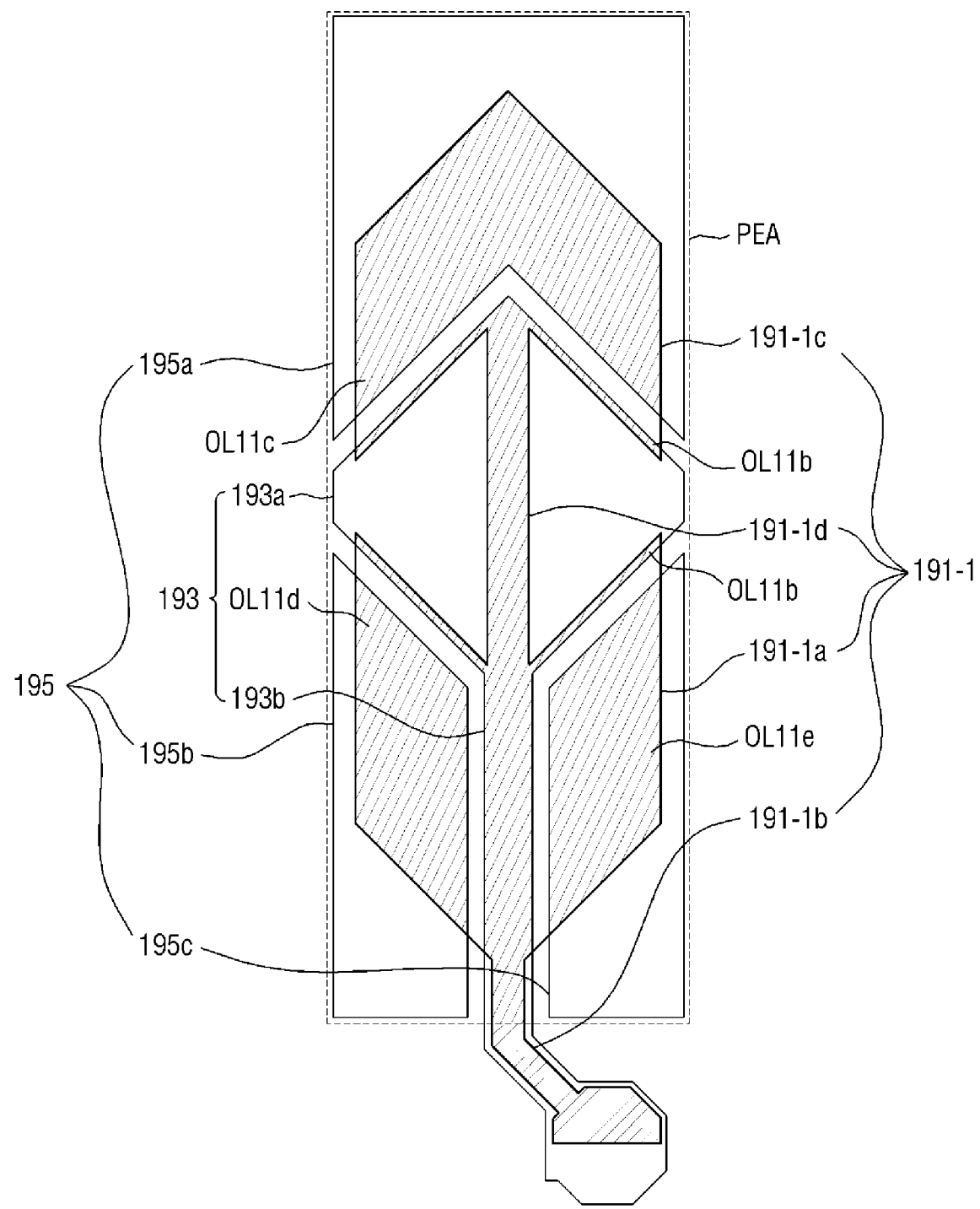
FIG. 22 is a plan view illustrating how the first sub-pixel electrode and a second sub-pixel electrode included in the first substrate of FIG. 19 overlap each other and how the first sub-pixel electrode and a third sub-pixel electrode included in the first substrate of FIG. 19 overlap each other.

FIG. 19 is a plan view of a first substrate, and particularly, a pixel, of a display device according to another exemplary embodiment of the invention, FIG. 20 is a plan view of a first sub-pixel electrode included in the first substrate of FIG. 19, FIG. 21 is a plan view illustrating how the first sub-pixel electrode and a protruding portion included in the first substrate of FIG. 19 overlap each other, and FIG. 22 is a plan view illustrating how the first sub-pixel electrode and a second sub-pixel electrode included in the first substrate of FIG. 19 overlap each other and how the first sub-pixel electrode and a third sub-pixel electrode included in the first substrate of FIG. 19 overlap each other.

Referring to FIGS. 19 through 22, a display device 8 may be substantially identical, or at least similar, to from the display device 1 of FIGS. 1 through 12 except for a pixel electrode 190-1, and particularly, a first sub-pixel electrode 191-1, and thus will hereinafter be described, focusing mainly on differences with the display device 1 of FIGS. 1 through 12.

The first sub-pixel electrode 191-1 may include a first sub-plate electrode 191-1a, a first connecting electrode 191-1b, a second sub-plate electrode 191-1c, and a first stem electrode 191-1d. The first sub-plate electrode 191-1a, the second sub-plate electrode 191-1c, and the first stem electrode 191-1d may be disposed in a pixel area PEA, and the first connecting electrode 191-1b may be partially disposed in the pixel area PEA and may extend outside the pixel area PEA.

The first stem electrode 191-1d is an electrode connecting the first sub-plate electrode 191-1a and the second sub-plate electrode 191-1c. In exemplary embodiments, the first stem electrode 191-1d may be substantially parallel to a data line 171.

The first sub-plate electrode 191-1a may be connected to a first end of the first stem electrode 191-1d. The first sub-plate electrode 191-1a may be symmetrical with respect to the first stem electrode 191-1d. In exemplary embodiments, the first sub-plate electrode 191-1a may be in the shape of a combination of two parallelograms.

The second sub-plate electrode 191-1c may be connected to a second end of the first stem electrode 191-1d. The second sub-plate electrode 191-1c may be symmetrical with respect to the first stem electrode 191-1d. In exemplary embodiments, the second sub-plate electrode 191-1c may be in the shape of a combination of two parallelograms.

In exemplary embodiments, the first sub-plate electrode 191-1a and the second sub-plate electrode 191-1c may be symmetrical with respect to a horizontal stem portion of a protruding portion SP.

The first connecting electrode 191-1b, which is connected to the first sub-plate electrode 191-1a, may extend outside the pixel area PEA. The first connecting electrode 191-1b may be physically and electrically connected to a second sub-pixel electrode 193 and may be electrically connected to a drain electrode 175. In exemplary embodiments, a part of the first connecting electrode 191-1b in the pixel area PEA may be substantially parallel to the data line 171.

The first sub-pixel electrode 191-1 may have a portion (hereinafter, the first overlapping portion OL11a) overlapping the protruding portion SP. In an exemplary embodiment, in response to the first sub-pixel electrode 191-1 including the first sub-plate electrode 191-1a, the first connecting electrode 191-1b, the second sub-plate electrode 191-1c, and the first stem electrode 191-1d, the first overlapping portion OL11a may be provided in the first sub-plate electrode 191-1a, the first connecting electrode 191-1b, the second sub-plate electrode 191-1c, and the first stem electrode 191-1d, for example. In other words, the first sub-plate electrode 191-1a and the second sub-plate electrode 191-1c may at least partially overlap the protruding portion SP, and the first connecting electrode 191-1b and the first stem electrode 191-1d may overlap the protruding portion SP. However, the invention is not limited thereto. That is, the location of the first overlapping portion OL11a may vary depending on the shape or size of the protruding portion SP.

The first sub-pixel electrode 191-1 may have a portion (hereinafter, the second overlapping portion OL11b) overlapping the second sub-pixel electrode 193.

In an exemplary embodiment, in response to the first sub-pixel electrode 191-1 including the first sub-plate electrode 191-1a, the first connecting electrode 191-1b, the second sub-plate electrode 191-1c, and the first stem electrode 191-1d and the second sub-pixel electrode 193 including a second plate electrode 193a and a second connecting electrode 193b, the second overlapping portion OL11b may be provided in the first sub-plate electrode 191-1a, the first connecting electrode 191-1b, the second sub-plate electrode 191-1c, and the first stem electrode 191-1d, for example. Parts of the second overlapping portion OL11b in the first sub-plate electrode 191-1a and the second sub-plate electrode 191-1c may be portions partially overlapping the second plate electrode 193a. In other words, the first sub-plate electrode 191-la and the second plate electrode 193a may partially overlap each other, and the second sub-plate electrode 191-1c and the second plate electrode 193a may partially overlap each other.

Parts of the second overlapping portion OL11b in the first connecting electrode 191-1b and the first stem electrode 191-1d may be portions partially overlapping the second connecting electrode 193b. In other words, the first connecting electrode 191-1b and the second connecting electrode 193b may partially overlap each other, and the first stem electrode 191-1d and the second connecting electrode 193b may partially overlap each other.

The first sub-pixel electrode 191-1 may have a portion (hereinafter, the third overlapping portion OL11c, OL11d, and OL11e) overlapping a third sub-pixel electrode 195.

In an exemplary embodiment, in response to the first sub-pixel electrode 191-1 including the first sub-plate electrode 191-1a, the first connecting electrode 191-1b, the second sub-plate electrode 191-1c, and the first stem electrode 191-1d and the third sub-pixel electrode 195 including a first floating electrode 195a, a second floating electrode 195b, and a third floating electrode 195c, the third overlapping portion OL11c, OL11d, and OL11e may include a first sub-overlapping portion OL1c, a second sub-overlapping portion OL1d, and a third sub-overlapping portion OL1e, for example.

The first sub-overlapping portion OL1c may be a portion of the second sub-plate electrode 191-1c overlapping the first floating electrode 195*a*, the second sub-overlapping portion OL1*d* may be a portion of the first sub-plate electrode 191-1*a* overlapping the second floating electrode 195*b*, and the third sub-overlapping portion OL1*e* may be a portion of the first sub-plate electrode 191-1*a* overlapping the third floating electrode 195*c*. In other words, the first floating electrode 195*a* and the second sub-plate electrode 191-1*c* may partially overlap each other, and each of the second floating electrode 195*b* and the third floating electrode 195*c* and the first sub-plate electrode 191-*la* may partially overlap each other.

The ratio of the entire area of the third sub-pixel electrode 195 and the entire area of the third overlapping portion OL11*c*, OL11*d*, and OL11*e* may be determined in various manners, and by doing so, the level of a voltage provided to the third sub-pixel electrode 195 may be adjusted.

Figure 23:
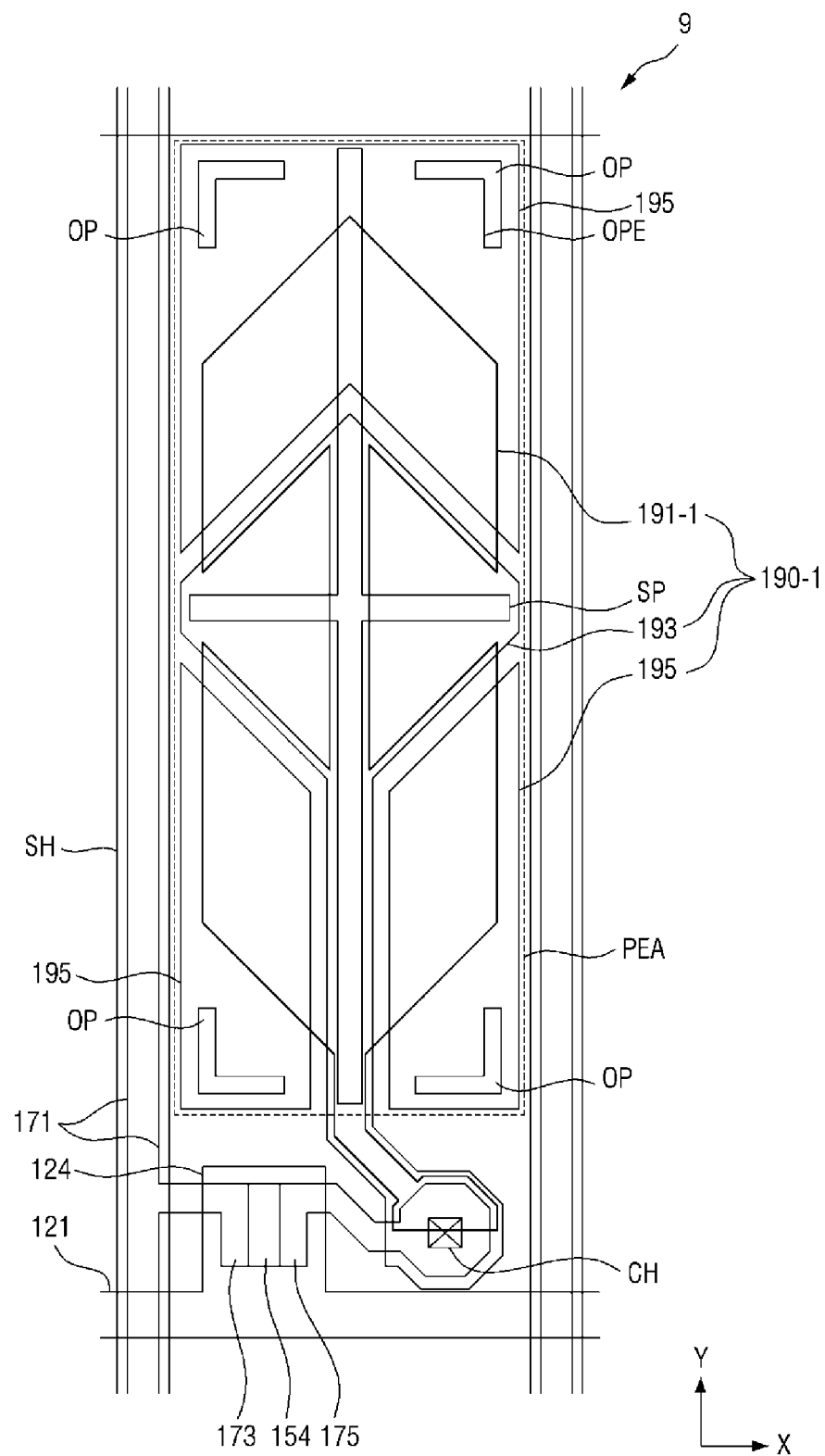
FIG. 23 is a plan view of another exemplary embodiment of a first substrate, and particularly, a pixel, of a display device according to the invention.

FIG. 23 is a plan view of a first substrate, and particularly, a pixel, of a display device according to another exemplary embodiment of the invention.

Referring to FIG. 23, a display device 9 may be substantially identical, or at least similar, to from the display device 8 of FIGS. 19 through 22 except that openings OP are defined in a third sub-pixel electrode 195.

The openings OP may be defined along the edges of a pixel electrode 190-1 disposed in a pixel area PEA, and particularly, along the edges of the third sub-pixel electrode 195. More than one opening OP may be defined to provide symmetry with respect to a protruding portion SP, which is cross-shaped. In exemplary embodiments, inner sides OPE of each of the openings OP may define a closed loop in a plan view.

As discussed above with reference to FIG. 18, since in the display device 9, the openings OP are defined, the intensity of a fringe field applied to the edges of the pixel electrode 190-1 may be controlled, and as a result, the deterioration of the display quality of the display device 9 may be prevented.

The protruding portion SP of the display device 8 or 9 of FIG. 19 through 22 or 23 may have various shapes, other than those set forth herein. In an exemplary embodiment, the protruding portion SP of the display device 8 or 9 may have the same structure as the protruding portion SP of FIG. 3 or may have the same structure as one of the protruding portion SP1 of FIG. 13, the protruding portion SP2 of FIG. 14, the protruding portion SP3 of FIG. 15, and the protruding portion SP4 of FIG. 16, for example. In an alternative exemplary embodiment, the protruding portion SP of the display device 8 or 9 may be a combination of at least two selected from among the protruding portion SP of FIG. 3, the protruding portion SP1 of FIG. 13, the protruding portion SP2 of FIG. 14, the protruding portion SP3 of FIG. 15, and the protruding portion SP4 of FIG. 16.

The exemplary embodiments of the invention have been described with reference to the accompanying drawings. However, those skilled in the art will appreciate that many variations and modifications can be made to the disclosed embodiments without substantially departing from the principles of the invention. Therefore, the disclosed embodiments of the invention are used in a generic and descriptive sense only and not for purposes of limitation.

What is claimed is:

1. A display device comprising:
a first substrate including a first base substrate, a gate line, which is disposed on a first surface of the first base substrate and extends in a first direction, a data line, which is disposed on the first surface of the first base substrate, extends in a second direction which intersects the first direction, and is insulated from the gate line, a lower passivation layer, which is disposed on the data line, a first sub-pixel electrode, which is disposed on the lower passivation layer, a passivation layer, which is disposed on the first sub-pixel electrode, and a second sub-pixel electrode, which is disposed on the passivation layer and partially overlaps the first sub-pixel electrode;
a second substrate facing the first substrate; and
a liquid crystal layer disposed between the first substrate and the second substrate,
wherein the second sub-pixel electrode includes a first portion, which is apart from the first surface of the first base substrate by a first distance, and a second portion, which is apart from the first surface of the first base substrate by a second distance which is less than the first distance,
wherein the first sub-pixel electrode includes a third portion overlapping the first portion of the second sub-pixel electrode and a fourth portion overlapping the second portion of the second sub-pixel electrode,
wherein an upper surface of the third portion is apart from the first surface of the first base substrate by a third distance,
wherein an upper surface of the fourth portion is apart from the first surface of the first base substrate by a fourth distance which is less than the third distance,
wherein the second portion of the second sub-pixel electrode does not contact the first sub-pixel electrode,
wherein the first portion of the second sub-pixel electrode overlaps an entirety of the third portion of the first sub-pixel electrode in a pixel area,
wherein an entirety of the first sub-pixel electrode is disposed in a different layer from the second sub-pixel electrode in the pixel area, and
wherein the data line is disposed in a different layer from the first sub-pixel electrode and the second sub-pixel electrode.

2. The display device of claim 1, wherein a difference between the first distance and the second distance ranges from about 0.3 micrometer to about 1.5 micrometers.

3. The display device of claim 1, wherein the first substrate further includes a protruding pattern, which is disposed on the same layer as that on which the gate line is disposed, isolated from the gate line, and overlaps the first portion.

4. The display device of claim 3, wherein the protruding pattern comprises the same material as that of the gate line.

5. The display device of claim 1, wherein the first substrate further includes a protruding pattern which is disposed on the same layer as that on which the data line is disposed, isolated from the data line, and overlaps the first portion.

6. The display device of claim 5, wherein the protruding pattern comprises the same material as that of the data line.

7. The display device of claim 1, wherein the first substrate further includes a protruding pattern, which is disposed on the lower passivation layer , overlaps the first portion, and comprises an insulating material, and an insulating layer, which is disposed on the protruding pattern, and the first sub-pixel electrode is disposed on the insulating layer.

8. The display device of claim 7, wherein the protruding pattern comprises the same material as that of the lower passivation layer.

9. The display device of claim 7, wherein the insulating layer comprises a first color pigment and the protruding pattern comprises a second color pigment, which is different from the first color pigment.

10. The display device of claim 1, wherein the first substrate further includes an insulating layer, which is disposed on the lower passivation layer; and a protruding pattern, which is disposed on the insulating layer, overlaps the first portion, and comprises an insulating material, and the first sub-pixel electrode is disposed on the insulating layer.

11. The display device of claim 10, wherein the protruding pattern comprises the same material as that of the insulating layer.

12. A display device comprising:
a first substrate including a first base substrate, a first sub-pixel electrode, which is disposed on a first surface of the first base substrate, a passivation layer, which is disposed on the first sub-pixel electrode, and a second sub-pixel electrode, which is disposed on the passivation layer and partially overlaps the first sub-pixel electrode;
a second substrate facing the first substrate; and
a liquid crystal layer disposed between the first substrate and the second substrate,
wherein the second sub-pixel electrode includes a first portion, which is apart from the first surface of the first base substrate by a first distance, and a second portion, which is apart from the first surface of the first base substrate by a second distance which is less than the first distance,
wherein the first substrate further includes a protruding pattern, which is disposed between a lower surface of the passivation layer and an upper surface of the first sub-pixel electrode and comprises an insulating material,
wherein the second portion of the second sub-pixel electrode does not contact the first sub-pixel electrode,
wherein the protruding pattern overlaps the first portion of the second sub-pixel electrode, and
wherein the second sub-pixel electrode overlaps the first sub-pixel electrode in a transmitting area of a pixel area.

13. The display device of claim 1, wherein the first substrate further includes a protruding pattern, which is disposed between the first surface of the first base substrate and the second sub-pixel electrode and overlaps the first portion, and the first portion and the protruding pattern are cross-shaped in a plan view.

14. The display device of claim 13, wherein a center of the protruding pattern overlaps the second sub-pixel electrode.

15. The display device of claim 1, wherein the first substrate further includes a switching device, which is disposed on the first surface of the first base substrate, and the first sub-pixel electrode and the second sub-pixel electrode are electrically connected to the switching device.

16. The display device of claim 15, wherein the first substrate further includes a third sub-pixel electrode, which is disposed on the passivation layer, is isolated from the second sub-pixel electrode and partially overlaps the first sub-pixel electrode.

17. The display device of claim 16, wherein the third sub-pixel electrode is a floating electrode.

18. The display device of claim 16, wherein the first substrate further includes a protruding pattern, which is disposed between the first surface of the first base substrate and the second sub-pixel electrode and overlaps the first portion, and the third sub-pixel electrode includes a first floating electrode, which includes a portion overlapping the first sub-pixel electrode and a portion overlapping the protruding pattern, a second floating electrode, which is isolated from the first floating electrode and includes a portion overlapping the first sub-pixel electrode, and a third floating electrode, which is isolated from the first floating electrode and the second floating electrode and includes a portion overlapping the first sub-pixel electrode.

19. The display device of claim 18, wherein the second floating electrode and the third floating electrode do not overlap the protruding pattern.

20. The display device of claim 16, wherein openings are defined in the third sub-pixel electrode and sides of each of the openings define a closed loop.

21. The display device of claim 16, wherein the first sub-pixel electrode includes a first plate electrode, which includes a portion overlapping the second sub-pixel electrode and a portion overlapping the third sub-pixel electrode; and a first connecting electrode, which electrically connects the first plate electrode and the switching device.

22. The display device of claim 21, wherein the first substrate further includes a protruding pattern, which is disposed between the first surface of the first base substrate and the second sub-pixel electrode and overlaps the first portion, and the first plate electrode overlaps the protruding pattern.

23. The display device of claim 21, wherein the first plate electrode includes a first sub-plate electrode, which includes a portion overlapping the second sub-pixel electrode and a portion overlapping the third sub-pixel electrode and is connected to the first connecting electrode, and a second sub-plate electrode, which includes a portion overlapping the second sub-pixel electrode and a portion overlapping the third sub-pixel electrode and is isolated from the first sub-plate electrode, and the first sub-pixel electrode further includes a first stem electrode, which includes one end connected to the first sub-plate electrode and another end connected to the second sub-plate electrode.

24. The display device of claim 21, wherein the first substrate further includes a protruding pattern, which is disposed between the first surface of the first base substrate and the second sub-pixel electrode and overlaps the first portion, and the second sub-pixel electrode includes a second plate electrode, which includes a portion overlapping the first plate electrode and a portion overlapping the protruding pattern, and a second connecting electrode, which electrically connects the second plate electrode and the switching device.

25. The display device of claim 1, wherein the first substrate further includes a shielding electrode, which extends in the second direction and overlaps the data line, and the shielding electrode is disposed on the same layer as that on which the first sub-pixel electrode is disposed, and isolated from the first sub-pixel electrode.

26. The display device of claim 25, wherein the shielding electrode comprises the same material as that of the first sub-pixel electrode.

27. A display device comprising:
a first substrate including a first base substrate, a gate line, which is disposed on a first surface of the first base substrate and extends in a first direction, a data line, which is disposed on the first surface of the first base substrate, extends in a second direction which intersects the first direction, and is insulated from the gate line, a lower passivation layer, which is disposed on the data line, a first sub-pixel electrode, which is disposed on the lower passivation layer, a passivation layer, which is disposed on the first sub-pixel electrode, and a second sub-pixel electrode, which is disposed on the passivation layer and partially overlaps the first sub-pixel electrode;

a second substrate facing the first substrate and including a second base substrate and a common electrode, which is disposed on a first surface of the second base substrate facing the first substrate; and a liquid crystal layer disposed between the first substrate and the second substrate, wherein the second sub-pixel electrode includes a first portion, which is apart from the common electrode by a first distance, and a second portion, which is apart from the common electrode by a second distance which is larger than the first distance, wherein the first sub-pixel electrode includes a third portion overlapping the first portion of the second sub-pixel electrode and a fourth portion overlapping the second portion of the second sub-pixel electrode, wherein an upper surface of the third portion is apart from the common electrode by a third distance, wherein an upper surface of the fourth portion is apart from the common electrode by a fourth distance which is longer than the third distance, wherein the second portion of the second sub-pixel electrode does not contact the first sub-pixel electrode, wherein the first portion of the second sub-pixel electrode overlaps an entirety of the third portion of the first sub-pixel electrode in a pixel area, wherein an entirety of the first sub-pixel electrode is disposed in a different layer from the second sub-pixel electrode in the pixel area, and wherein the data line is disposed in a different layer from the first sub-pixel electrode and the second sub-pixel electrode.

28. The display device of claim 27, wherein a difference between the first distance and the second distance ranges from about 0.3 micrometer to about 1.5 micrometers.

29. The display device of claim 27, wherein the first substrate further includes a switching device, which is disposed on the first surface of the first base substrate, and the first sub-pixel electrode and the second sub-pixel electrode are electrically connected to the switching device.

30. The display device of claim 29, wherein the first substrate further includes a third sub-pixel electrode, which is disposed on the passivation layer, is isolated from the second sub-pixel electrode, and partially overlaps the first sub-pixel electrode.

31. The display device of claim 30, wherein the third sub-pixel electrode is a floating electrode.

32. The display device of claim 31, wherein openings are defined in the third sub-pixel electrode and sides of each of the openings define a closed loop.

33. The display device of claim 27, wherein the first substrate further includes a shielding electrode, which extends in the second direction and overlaps the data line, and the shielding electrode is disposed on the same layer as that on which the first sub-pixel electrode is disposed, and isolated from the first sub-pixel electrode.

34. The display device of claim 33, wherein a voltage having the same level as that of a voltage applied to the common electrode is applied to the shielding electrode.

35. The display device of claim 33, wherein the shielding electrode comprises the same material as that of the first sub-pixel electrode.

* * * * *